US012452957B2

(12) United States Patent
Garagic et al.

(10) Patent No.: US 12,452,957 B2
(45) Date of Patent: Oct. 21, 2025

(54) CLOSED LOOP TASKING AND CONTROL OF HETEROGENEOUS SENSOR NETWORKS

(71) Applicant: Sarcos Corp., Salt Lake City, UT (US)

(72) Inventors: Denis Garagic, Salt Lake City, UT (US); Robert Ravier, Salt Lake City, UT (US); Travis Galoppo, Princeton, NC (US); Rex Jameson, Salt Lake City, UT (US); Fraser M. Smith, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

(21) Appl. No.: 18/907,392

(22) Filed: Oct. 4, 2024

(65) Prior Publication Data

US 2025/0119982 A1    Apr. 10, 2025

Related U.S. Application Data

(60) Provisional application No. 63/588,675, filed on Oct. 6, 2023.

(51) Int. Cl.
| | |
|---|---|
| *H04W 84/18* | (2009.01) |
| *G06N 3/092* | (2023.01) |
| *G06N 20/00* | (2019.01) |
| *H04W 4/02* | (2018.01) |
| *H04W 4/38* | (2018.01) |
| *G06V 20/17* | (2022.01) |

(52) U.S. Cl.
CPC ............ *H04W 84/18* (2013.01); *G06N 20/00* (2019.01); *H04W 4/02* (2013.01); *H04W 4/38* (2018.02); *G06N 3/092* (2023.01); *G06V 20/17* (2022.01)

(58) Field of Classification Search
CPC ....... H04W 4/028; H04W 4/38; H04W 12/00; H04W 12/009; H04W 28/021; H04W 28/0226; H04W 84/18; G06N 3/092
See application file for complete search history.

(56) References Cited

U.S. PATENT DOCUMENTS

| 11,567,512 B1 * | 1/2023 | Qi ........................... G05D 1/104 |
| 2023/0076192 A1 * | 3/2023 | Gemp .................... G06Q 50/04 |
| 2024/0249418 A1 * | 7/2024 | He ............................ G06T 7/20 |

OTHER PUBLICATIONS

Garagic et al., Machine Learning Multi-Modality Fusion Approaches Outperform Single-Modality & Traditional Approaches, 2021 IEEE Aerospace Conference, Mar. 6, 2021, 9 pages, Institute of Electrical and Electronics Engineers, Piscataway, New Jersey.

(Continued)

*Primary Examiner* — Shirley X Zhang
(74) *Attorney, Agent, or Firm* — Thorpe North & Western, LLP

(57) ABSTRACT

Technology is described for controlling a heterogeneous sensor node network. The method can include obtaining sensor data from a plurality of sensors which include a plurality of sensor modalities in sensor nodes. The sensor data may be combined in a joint feature space that represents multimodal input. Another operation may be detecting features from the sensor data using the joint feature space. Neighboring sensor nodes may be identified to receive the features. A further operation may be sending the features to other sensor nodes in a sensor node network.

33 Claims, 17 Drawing Sheets

(56) References Cited

OTHER PUBLICATIONS

Ravier et al., Online Reinforcement Learning for Autonomous Sensor Control, 2023 IEEE Aerospace Conference, Mar. 4, 2023, 34 pages, Institute of Electrical and Electronics Engineers, Piscataway, New Jersey.

Ravier et al., Reinforcement Learning-based Autonomous Sensor Control via Simultaneous Learning of Policies and State-Action Spaces, 2023 $26^{th}$ International Conference on Information Fusion, Jun. 27, 2023, 8 pages, Institute of Electrical and Electronics Engineers, Piscataway, New Jersey.

International Search Report for International Application No. PCT/US2024/050089 dated Jan. 31, 2025, 13 pages.

* cited by examiner

| TABLE I. MEAN VEHICLE TRACK DURATION (MTD) FOR POLICIES LEARNED FROM FUSION MODALITY COMBINATIONS. (GT = GROUND TRUTH) | | | | | |
|---|---|---|---|---|---|
| RL Alg. | OKLSPI | OKLSPI | OKLSPI | OKLSPI | PPO |
| Modality | EO, GT | EO, Radar | EO, RF | EO | EO, GT |
| MTD (s) | 6.53 | 8.48 | 6.88 | 5.28 | 1.9 |
| Std. Dev. (s) | ±2.61 | ±3.81 | ±2.88 | ±2.26 | ±3.28 |

FIG. 14

CLOSED LOOP TASKING AND CONTROL OF HETEROGENEOUS SENSOR NETWORKS

PRIORITY CLAIM

This application claims priority to U.S. Provisional Patent Application Ser. No. 63/588,675 entitled "Closed Loop Tasking and Control of Heterogeneous Exploring Sensors" which was filed on Oct. 6, 2023.

GOVERNMENT LICENSE RIGHTS

This invention was made with government support under Contract No. FA8750-22-CC-1005 awarded by the Air Force Research Laboratory. The government has certain rights in the invention.

BACKGROUND

Wireless sensor networks (WSNs) may describe networks of spatially separate sensors that monitor and record the physical conditions at the location of each sensor and send the collected data to a central location. In the past, WSNs have been used to measure physical conditions such as seismic data, construction data, temperature, sound, pollution levels, humidity, air pressure, and wind.

A WSN may include sensor nodes (e.g., a few sensor nodes, up to hundreds or thousands of sensor nodes) and each node may be wirelessly connected to other nodes with sensors. Nodes may have several parts: sensors, a radio transceiver with an antenna, a microcontroller, an electronic circuit for interfacing with the sensors and an energy source (e.g., a battery, a solar cell, or an electrical wire). Sensor nodes may vary in size from a handheld box to a thumbnail. Size and cost constraints constrain resources such as energy, memory, computational speed and communications bandwidth.

BRIEF DESCRIPTION OF THE DRAWINGS

FIG. 14 illustrates a table with mean vehicle track duration.

DETAILED DESCRIPTION

Figure 1A:
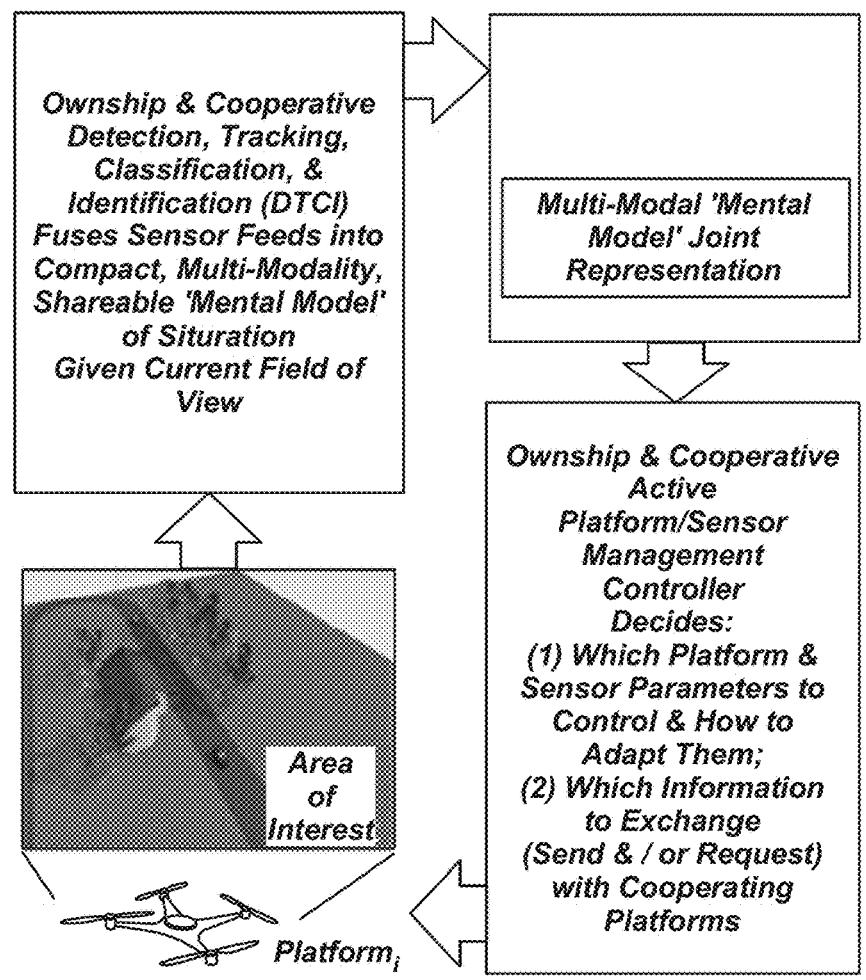
FIG. 1A illustrates an example of the collaborative sensor nodes and sensor behavior across a heterogeneous sensor network.
Figure 1A:
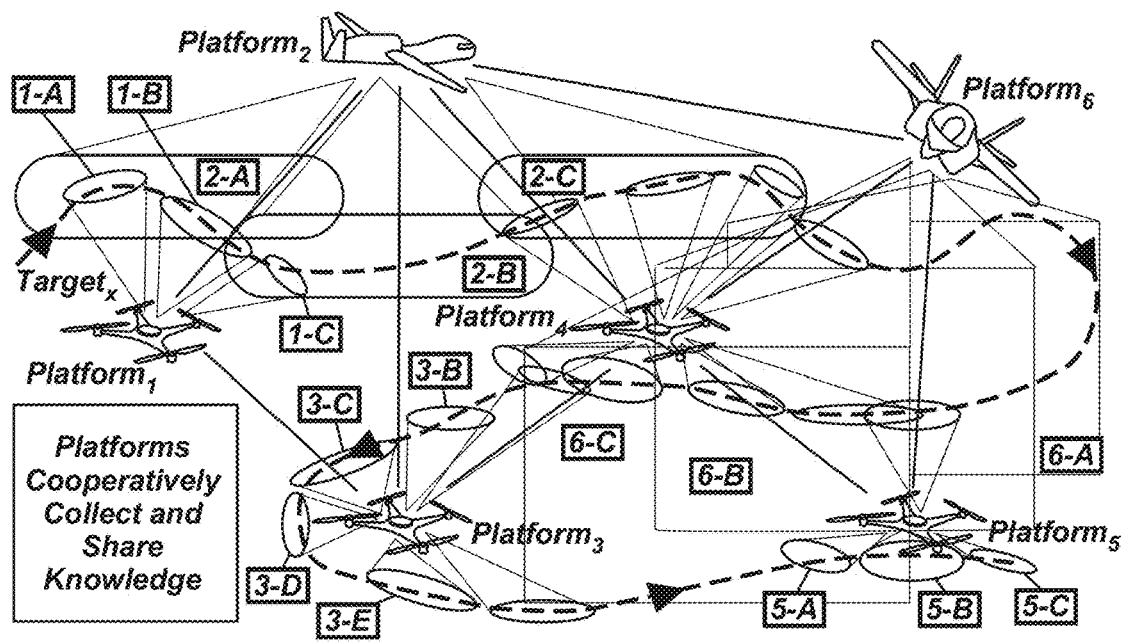

Reference will now be made to the examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

This technology includes processes and systems for the closed loop tasking and control of heterogeneous sensors (e.g., used for exploring) and is a generalized framework enabling the autonomous control of a heterogeneous sensing network (HSN) (e.g., a collection of physical devices or sensor nodes with sensors spread over a geographic area of interest (AOI)). Each sensor node or device can contain any number of sensors of potentially different modalities for improving sensor data fusion and exploitation of the multiple sensor data streams enabling improved object detection, tracking, classification, and identification (DTCI).

FIG. 1A illustrates an example of the collaborative sensor nodes and sensor behavior across the heterogeneous sensor network (HSN). The sensor nodes may be powered by an energy source such as a battery, a solar cell, a generator, a chemical reaction, etc., and the sensor nodes may be remotely controlled or piloted by a human. The sensors may include but are not limited to: electro-optical (EO) cameras, visible spectrum sensors, infrared (IR) sensors (all ranges), infrared (IR) cameras, sound sensors, seismic sensors, ultraviolet sensors (UV), microwave, X-ray, gamma rays, radars, Lidars, passive or active RF receivers, chemical sensors, and both reflected and emitted wavelengths and modalities. The sensors may also include underwater sensors, like sonar, i.e., reflected sound as well as emitted sound (including ultrasound, and the full acoustic spectrum). The sensors may be individual sensors or in the form of stereo and broad aperture arrays (i.e., more than one sensor to provide additional information). The data streams included with the sensor data streams may also include computed or processed data, such as GPS data, strain data, cell signals, clock data, and so forth. The technology may define upstream multi-sensor fusion and sensor management (See FIG. 1A, 102) on individual sensor nodes. DTCI information can be cooperatively shared and controller planning may occur across a dynamic network communication topology, i.e. in situations where the individual sensor devices or platforms maximize overall HSN performance (FIG. 1A, 106).

Information from data fusion and the top-down objectives can be used to manage HSN fleet sensor devices and sensors. An autonomous active sensing learning controller can be used that exploits multimodal sensor data fusion representations to enable active sensor control and management processes to adaptively optimize the sensor(s) and device control actions. The system may determine which sensing parameters to adapt and/or control to reduce the relevant uncertainties and to make the most rewarding trade-offs while taking full joint advantage of measurement level data.

This approach can fuse data from multiple sensor types, including imagery, radar, radio frequency (RF) signals, acoustics, seismic data or other types of electronic sensors. As a result, the technology can identify the relationships and insights that can be drawn from different sensor modalities, because it is uncommon for a single modality to provide a comprehensive understanding of the phenomena of interest. The end-to-end spatiotemporal processing pipeline may employ dynamic deep generative neural networks. This pipeline is designed for the fusion of 'raw' and/or feature-level data from multiple modalities and sensors. By leveraging these joint features, the multiple sensor nodes in the sensor network can efficiently detect, track, and classify various event signatures of interest (EOI).

Reinforcement learning can be employed where the controller seeks an improved control policy gradually as data is observed. An iterative procedure may be provided for learning the improving policy by directly estimating the Q-function (i.e., the reward function) from interactions with the environment. Using a combination of game theory optimization, reinforcement learning, and consensus optimization for multi-agent systems, each dynamic agent (such as a multi-modal sensor node) is a self-interested decision-maker.

Interaction between agents may occur over a dynamic communication graph. The goal is to maximize a problem-dependent global utility function (used interchangeably with "reward function") by enabling sensor nodes to make individually rational decisions that maximize their utility functions based on the online reinforcement learning method. The resulting optimization problem has at least two aspects. First, the utility functions (or reward functions) for the sensor node agents align individual goals with cooperation between these agents. These utility functions may focus on local node performance while contributing to the overall global utility function. Second, sensor nodes may have a negotiation mechanism through which they can optimize their utility functions within the entire HSN. This negotiation mechanism is a consensus problem transformed into a noncooperative differential game problem. This mechanism determines the desired utility function for the sensor graph as a whole and the corresponding optimal control strategy, with minimal connectivity assumptions on the communication topology.

Figure 1B:
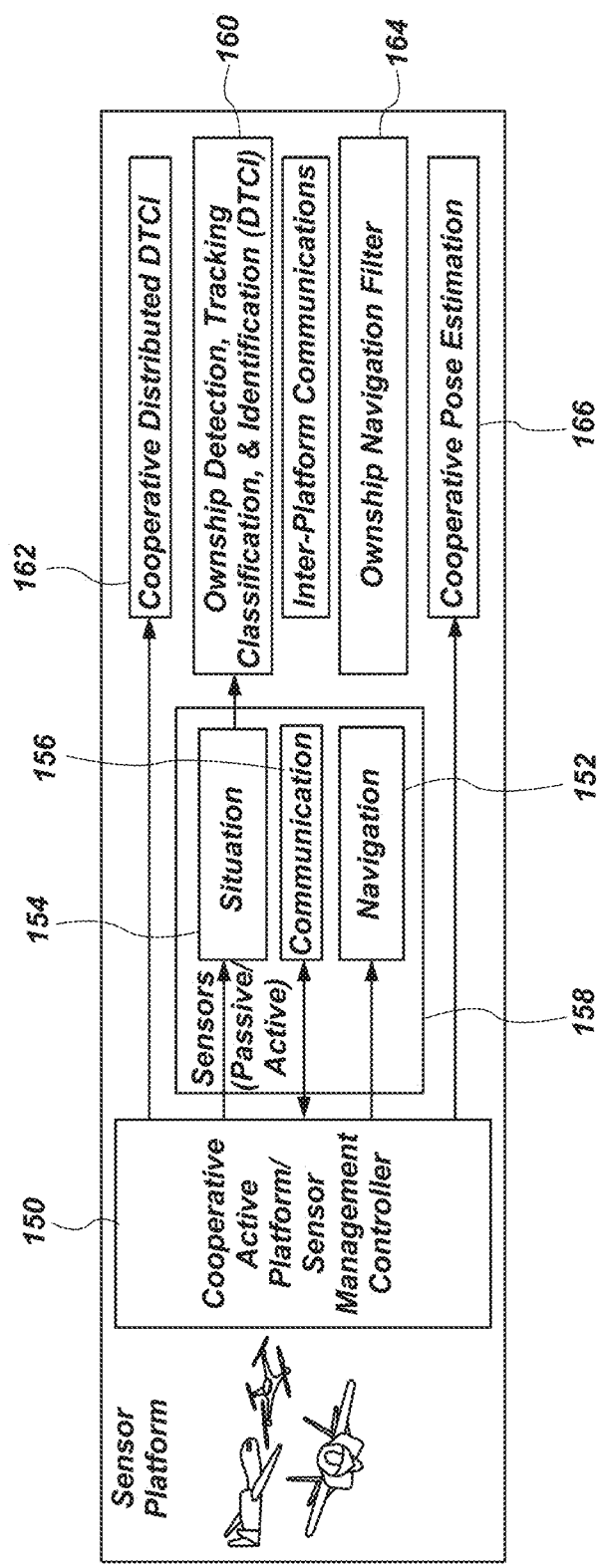
FIG. 1B is a block diagram illustrating an example of a single sensor node functional architecture.

The sensors and sensor nodes are configured to enhance collaboration using the collaboration software across a heterogeneous sensor network (HSN) and provide the highest possible level of DTCI and situation awareness (SA). Closed loop processing, as in the top loop of FIG. 1A, incorporates distributed and decentralized sensing, scene understanding, decision making, platform control and sensor control. Inter-platform information exchange of SA estimates, local decisions, and additional measurements can provide valuable DTCI performance against one or more targets and across the entire dynamically evolving and adaptively controlled HSN. One portion of the system and/or processes is a framework for HSN multi-sensor, multi-platform DTCI and sensor management. FIG. 1B illustrates an example of the single HSN node functional architecture. This cooperative active platform can include a sensor management controller 150 which may autonomously operate each HSN node to obtain the best multi-sensor measurements to resolve representation uncertainty and enhance situational awareness. This sensor management controller 150 may control navigation sensors 152 to provide information that guides the platform to a desired collection location and/or orientation using the ownship navigation filter 164 and cooperative pose estimation 166. The sensor management controller 150 may also control situation sensors 154 (i.e., cameras, radars, receivers) to gather ISR (intelligence, surveillance, reconnaissance) relevant data that drive ownship DTCI. The sensor management controller 150 may control communications 156 with other HSN nodes to exchange information and/or make requests for information to enable cooperation across the HSN. The controller may convey relevant shared situation and/or navigation with the cooperation DTCI, and navigation sub-modules for inclusion in DTCI. Navigation processing and reasoning may be provided that enhances the collective knowledge and understanding available to the sensor management controller 150 as the sensor management controller 150 makes decisions.

Figure 2:
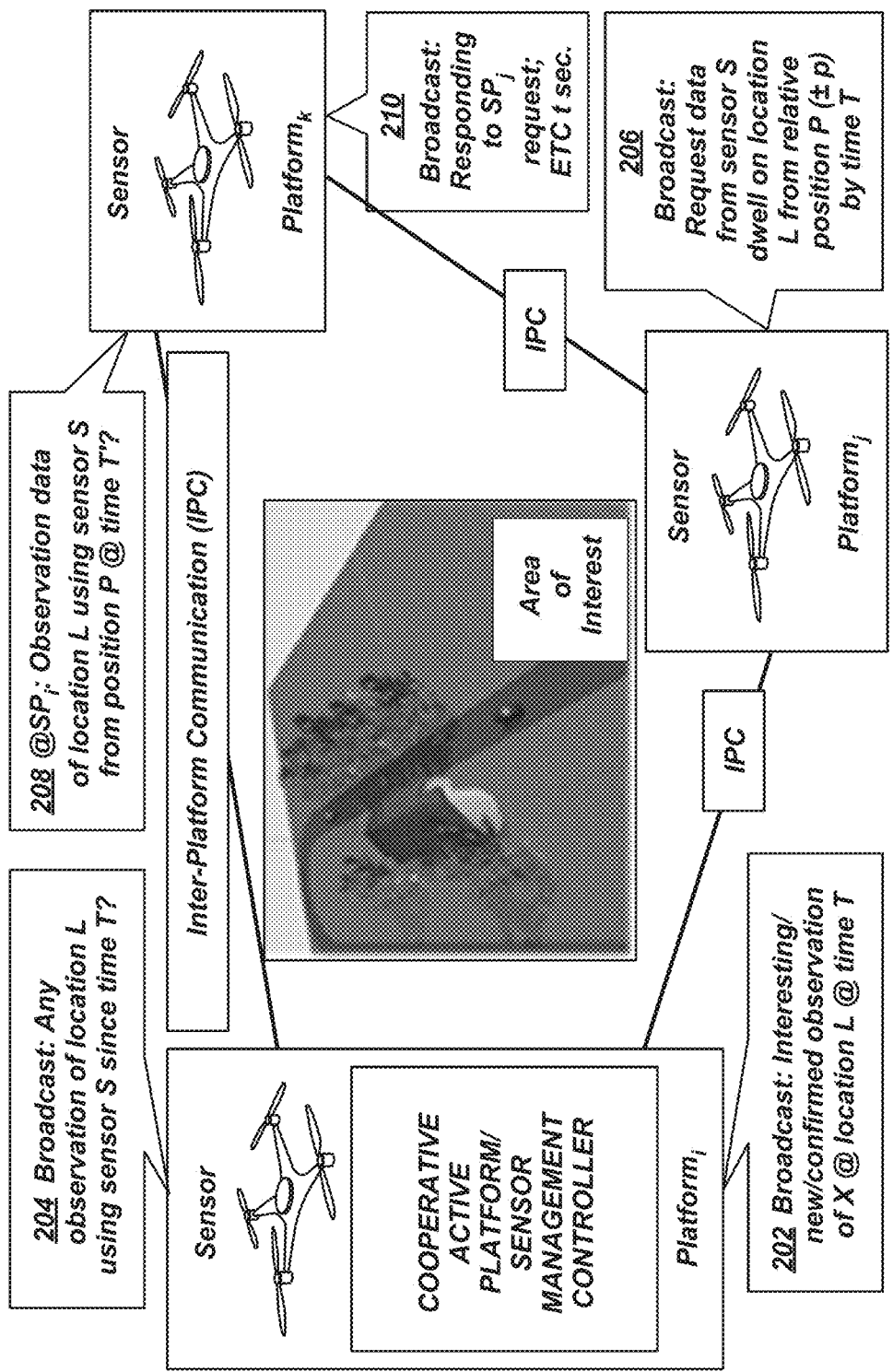
FIG. 2 is a block diagram illustrating an example of how nodes communicate to exchange information and collaborate to enhance situational understanding of activity in a scene of interest.

FIG. 2 illustrates an example of how nodes communicate to exchange information and collaborate to enhance situational understanding of activity in a scene of interest. HSNs may be similar to wireless ad hoc networks in the sense that they rely on wireless connectivity and dynamic formation of networks so that sensor data can be communicated wirelessly. One use of such networks may be military applications such as battlefield surveillance. Other use types for sensors networks may be industrial and consumer applications, such as industrial process monitoring, control and machine health monitoring, warehouse management, agriculture, etc.

The sensor platform architecture can close the loop between distributed and decentralized sensing, decision-making, pattern recognition, relative localization, and control. As FIG. 1B illustrates, each sensor platform node executes an on-line, decentralized, cooperative active platform/sensor management decision process or controller to optimally perform close-loop detection, tracking, classification, and identification (DCTI). Working from right to left (following the data flow), an ownship (i.e., local sensor node) processing module 160 performs processing of ownship multi-modal sensor data and embeds results into the joint probability space (which encodes all the information available to the host sensor node). Then a Cooperative Distributive DTCI processing module 162 adds new information from other sensor nodes to enhance the representation derived from the platform's ownship joint space, resulting in that sensor node's multi-modal representation of detections from the environment (see FIG. 2). This representation characterizes detections by type, activity, and behavior. The Cooperative Active Platform/Sensor Management Controller module 150 or process may mediate intra- and inter-platform optimization (e.g., changing sensor parameters and sensor node physical poses) and communication to ensure observation of targets by a team of cooperating sensor platforms.

The limited computing power of individual sensor nodes can be assimilated into a network of cooperating sensor platforms that coordinate to perform decentralized DTCI on board each sensor node in a distributed manner. In the heterogeneous sensor network model, each sensor node (e.g., as in FIG. 1B and FIG. 2) is autonomously—yet cooperatively—guided, navigated and controlled by a cooperative active platform/sensor management controller to detect, track, classify, and identify potential targets within an area of interest (AOI) using the joint feature measurements from throughout the network and sensing configurations achieved individually and across the swarm, which are shared and coordinated via inter-platform communication (FIG. 2).

The individual sensor nodes can broadcast or share noteworthy observations with other sensor nodes 202. Requests for information (RFIs) may be issued between the individual sensor nodes 204, 206, and the sensor nodes may respond to the RFIs 208, 210. This cooperative dialog improves knowledge sharing and optimizes collection configuration to enhance ownship platform and aggregate swarm DTCI performance and scene understanding. Thus, the group and the platform can see and substantially achieve coordinated behavior between members of a swarm to improve collective understanding of the target state estimates (e.g. target class types).

Each platform can learn a distributed, low-dimensional, multimodal data representation (i.e., a joint feature model) that maximizes discriminativeness of classes projected into the representation space by adaptively tuning sensor parameters to increase the value of information they contribute. Within a team of cooperating sensor nodes, these joint feature model representations are shareable either partially or completely, depending on communication constraints. Such communication constraints include, but are not limited to, dynamically changing communication topology and limited communication bandwidth. Moreover, behavior between sensor platforms can be coordinated in a network, see FIG. 3. This leverages the network's capacity for obtaining 'simultaneous' or corresponding samples to improve target state estimates (e.g., target class type).

Figure 3:
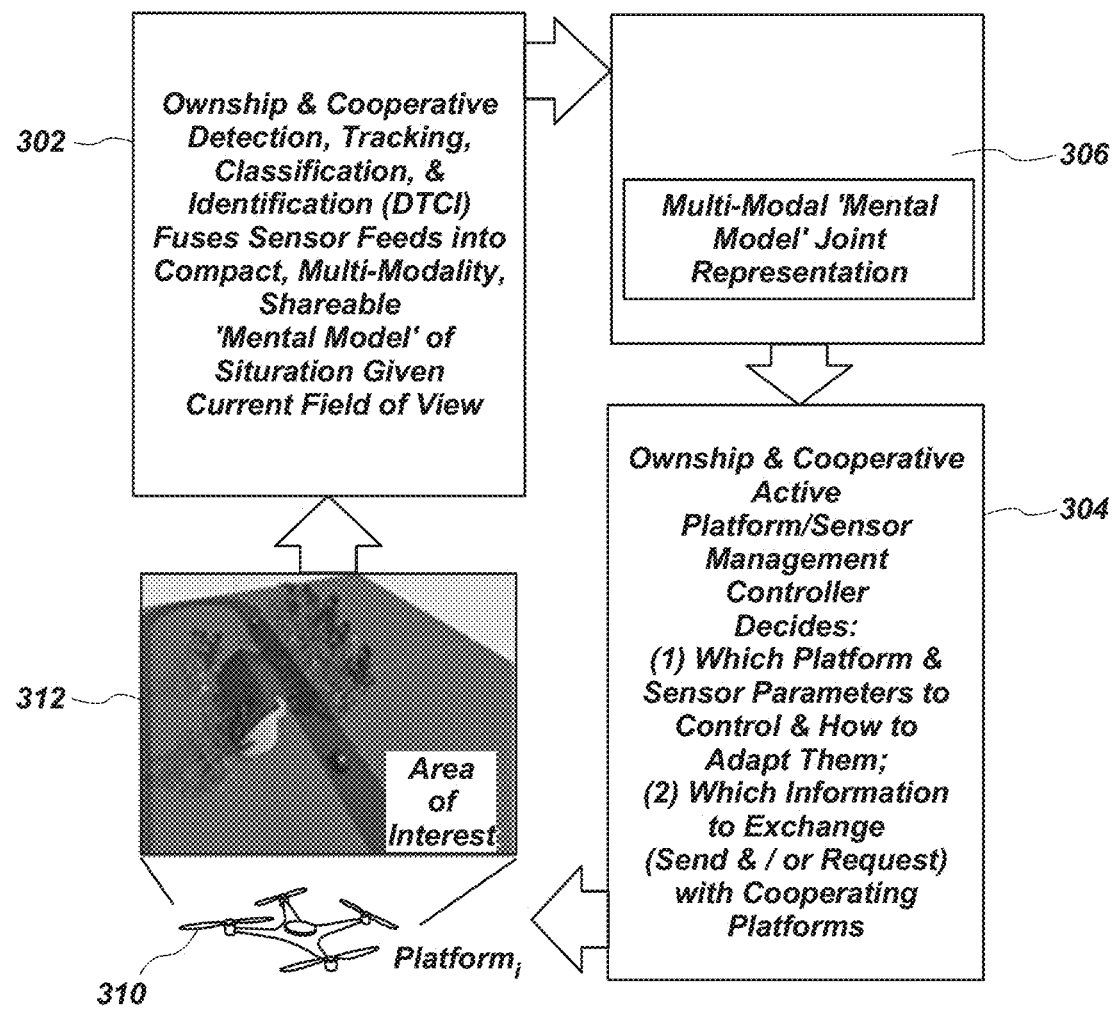
FIG. 3 is a block diagram illustrating multimodal data fusion, information extraction and information sharing.

FIG. 3 further illustrates multimodal data fusion and information extraction 302 to provide a substrate for online RL sensor management, reasoning and decision making 304. Fusion creates a compact, discriminative, joint multi-modal feature representation 306 of local observations from sensors with a sensor node 310 sensing an environment 312 (or simulated environment). Sensor management methods condition sensor and platform information within this representation to adaptively optimize sensor and platform control. RL sensor management can map perceptions to actions. Adaptive selection, through learning, can map high-dimensional perception states to high-level decision variables for low-level sensor controllers. Decision variables can generate control commands for changing sensor parameters to increase overall information gain.

A combination of online reinforcement learning (RL) at each individual sensor node along with game theory optimization as a negotiation mechanism between individual sensor nodes in a geographic AOI can be used to optimally allocate their available sensing and computing resources. The negotiating nodes exchange information summarizing their individual awareness of the scene given their observations and information shared with them by other nodes. Once they complete their information exchange, the negotiating nodes play an assignment game to allocate their available resources to detect the known objects in the scene. The RL agents on each sensor node can use the resulting allocation assignments to modify their objective functions to the new subset of targets that they are allotted. By continuously repeating this process, the nodes can communicate and adapt to ever-changing situations, allowing for allocation of resources to improve situational awareness based on the evolving utilities employed by each HSN node.

This approach achieves: 1) learning for an HSN-wide value function and 2) providing the associated control policy for each sensor node through local computation and peer-to-peer information sharing (cooperation) over a sparse time-varying communication network (FIG. 2). The design of the distributed learning framework (FIG. 2) aims to be more general while focusing on online HSN control.

Figure 4A:
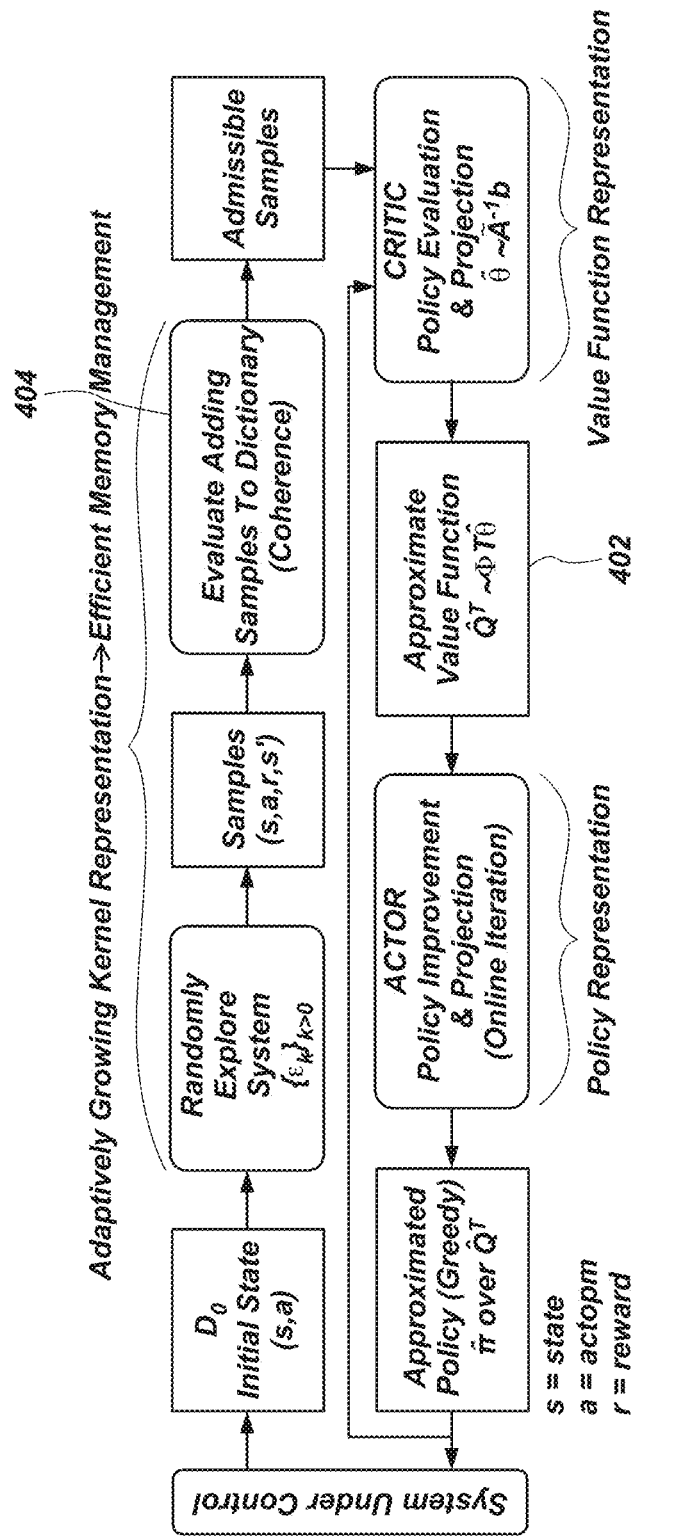
FIG. 4A is a block diagram illustrating an example of a single node iterative RL process.

At any point in time, each sensor node has access to its local value function, and potentially value function information from other sensor nodes with a current communication link, but not a HSN-wide global value function. This system provides a fully distributed setting with mutual neighborhood communication over a sparse, time-varying communication network topology. Sensor nodes can disseminate the locally estimated costs (that incorporate weighted influence of information from communicating neighbors when available, as described below) within their communication neighborhood (FIG. 4A). One feature of this approach is that a linear architecture approximates the state-action value function (i.e., Q function or reward function) for each sensor node where the actual representation is a compact description of the basis functions and a set of parameters. In fact, the policy is not physically stored anywhere but is computed only on demand. Furthermore, this compact policy representation function (FIG. 4A-Approximate Value Function block 402) is readily shared between cooperating agents that have a communication link. More specifically, for any query state, s, a sensor node calculates a combined representation of its own value function and those received from the neighboring agents. It computes all-action values in that state and performs the maximization to derive the greedy action choice for that state. As a result, all approximations and errors in policy improvement and representation are eliminated at the cost of some extra optimization for each query to the policy.

Figure 4B:
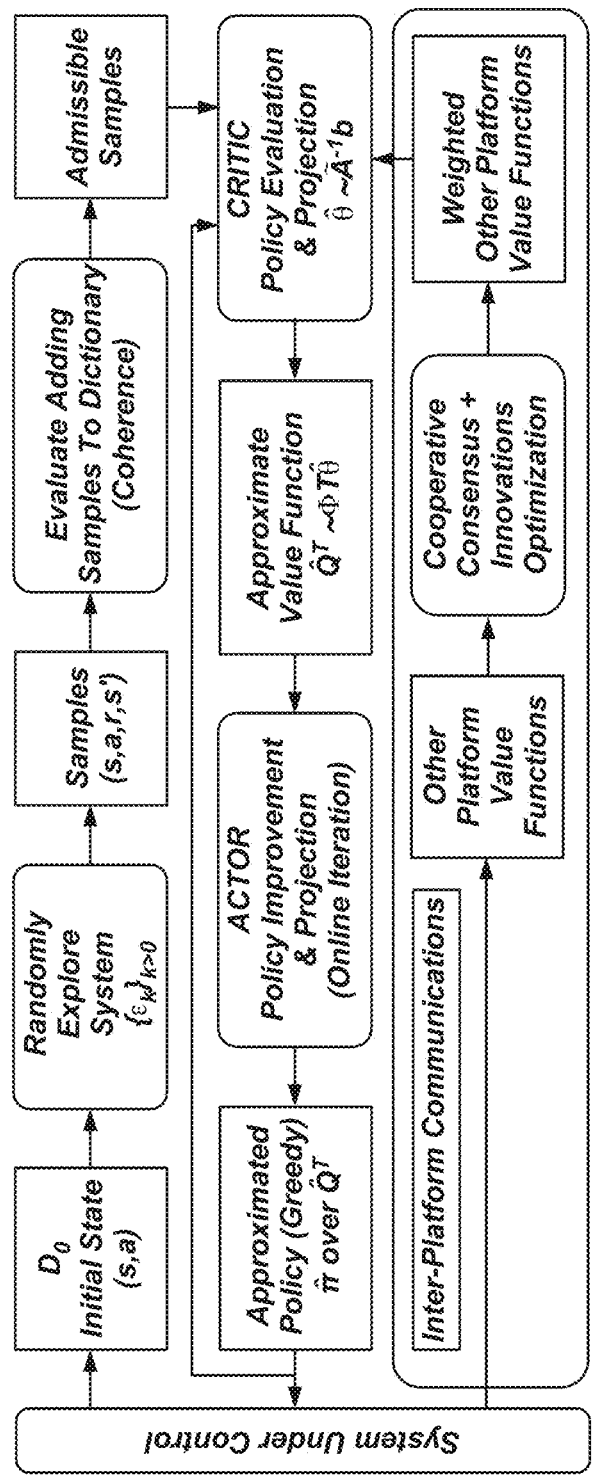
FIG. 4B is a block diagram illustrating an example of a cooperative coordination side loop for the RL process.

FIG. 4A further illustrates a single platform iterative RL process that is an online approximate policy iteration process that learns decision policies from samples so that the policy improvements must be performed every few samples before an accurate policy evaluation of the current policy can be completed. Moreover, this online RL method can efficiently collect its own samples which are only added to the dictionary as needed (Evaluate Adding Samples to Dictionary 404) and the entire process is repeated until a convergence criterion is fulfilled. FIG. 4B illustrates a cooperative coordination side loop that extends the single platform iterative RL process of FIG. 4A to blend information from communicating HSN platforms into an online approximation.

This distributed approach uses RL (reinforcement learning) and game theory to provide autonomous, distributed control of an HSN, consisting of multiple sensor nodes, to improve sensor data collection, fusion, and exploitation. The distributed optimization strategy for multi-agent reinforcement learning leverages game-theoretic optimization across a team of multi-modality sensor nodes and targets operating over an area of interest. This approach combines game theory optimization, reinforcement learning, and consensus optimization for multi-agent systems. Each dynamic agent, such as a multi-modal sensor node, is a self-interested decision-maker. Interaction between agents occurs over a dynamic communication graph.

One goal is to optimize a global utility function by enabling sensor nodes to make individually rational decisions that optimize their utility functions based on the online reinforcement learning method presented here. The resulting optimization problem has two essential aspects. First, utility functions (or reward functions) for the sensor node agents align individual goals with cooperation between these agents. These utility functions focus on local node performance while contributing to the overall global utility function. Second, sensor nodes have a negotiation mechanism through which they can optimize their utility functions within the entire HSN context. This negotiation mechanism is a consensus problem transformed into a noncooperative differential game problem. This mechanism determines the desired utility function (i.e. reward function or value function) for the HSN as a whole and the corresponding optimal control strategy, even with minimal connectivity assumptions on the communication topology.

Sensor node negotiations may lead to assignments of sensors to targets as scenarios evolve over time. Through the negotiation strategy, sensor nodes may reach consensus on the state of each target, while achieving efficient feature acquisition and improving various performance criteria such as tracking accuracy, comprehensive area coverage, and sensor resolution.

In this set of approaches, agents simultaneously incorporate information (e.g., the state-action value function or reward function) received from their communicating neighbors for each agent and their own instantaneous locally sensed costs in the same update rule. As such, the resulting value function updates processed at the agents are mixed time-scale. The distinct potentials of consensus (corresponding to information mixing through neighborhood communication) and local innovation (corresponding to the instantaneous locally estimated value function) trade-off appropriately. Without inter-agent communication (the consensus potential), the locally sensed costs at the agents are not sufficient to provide an observable approximation of the desired global cost function. On the other hand, given that the inter-agent communication network is not fully connected, an exact reconstruction of the instantaneous global value function is not possible. Hence, it is useful to appropriately balance the two potentials, so that in the long term the network information diffuses sufficiently to guarantee increasingly better global cost observability at the sensor nodes over time. Suitable design of the time-varying weight sequences associated with the consensus and innovation potentials enables distributed online policy iteration learning to achieve optimal learning performance asymptotically. That is, the sensor nodes reach consensus on the desired utility function and the corresponding optimal control strategy, under minimal connectivity on the communication topology.

Figure 5:
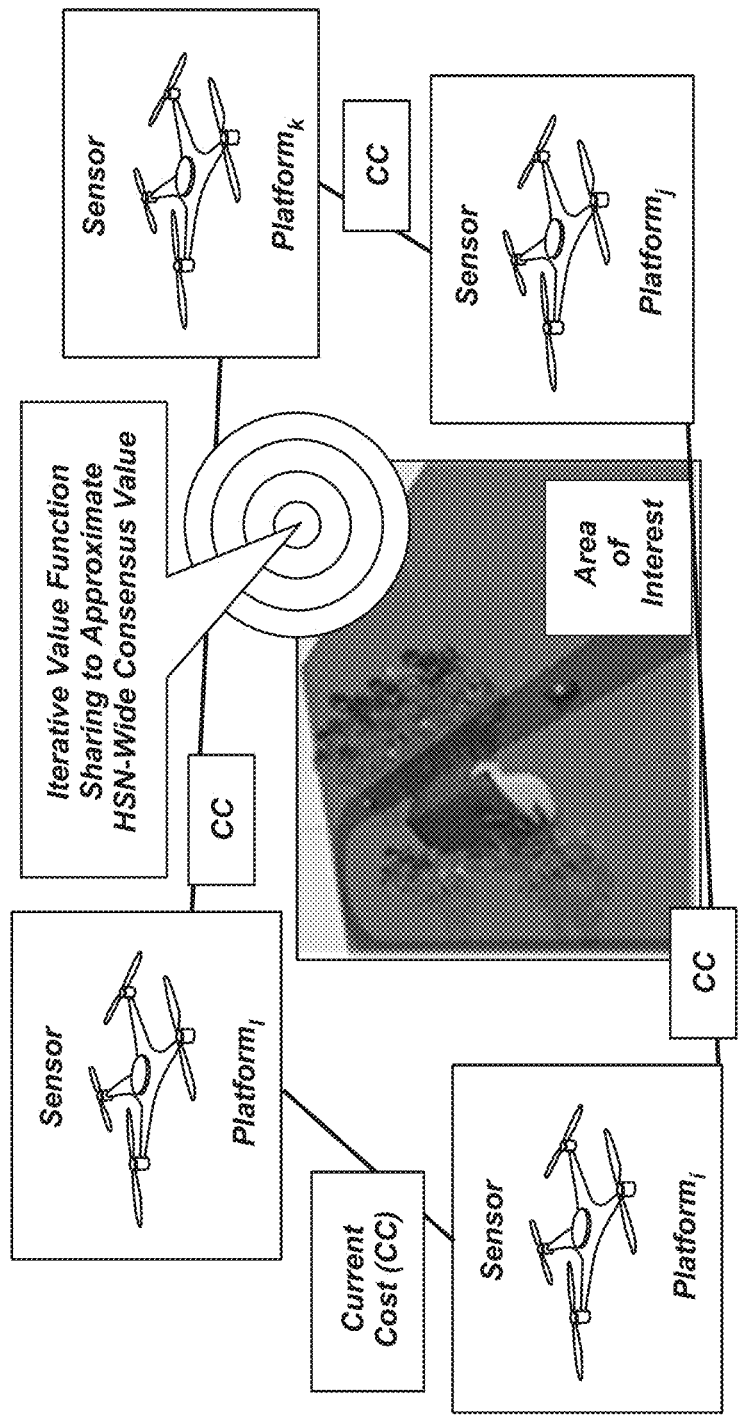
FIG. 5 is a block diagram illustrating an example of an iteratively shared coordination state.

FIG. 5 is a block diagram illustrating an example of an iteratively shared coordination state to improve collection configurations by approximating a network-wide average value function. The target shape illustrates progressive optimization toward an HSN-wide consensus outcome, which the Cooperative Coordinate Side loop illustrated in FIG. 5 works toward. Changing HSN and scene configurations may mean that steady state is never fully achieved.

Ownship Detection, Tracking, Classification, & Identification (DTCI)

An autonomous active sensing learning controller can exploit multimodal sensor data fusion representations to enable active sensor management processes to adaptively optimize sensor and sensor node control actions and improve overall DTCI (FIG. 3, 302) performance. Upstream fusion (e.g., of features from 'raw' sensor data) may outperform downstream fusion and that upstream fusion is superior to processing of any single modality in isolation. Variants of this pipeline may operate at the measurement level by creating multi-modal features across heterogeneous sensing data to achieve upstream fusion.

Continuous DTCI of objects and events involving their activities evolving over space and time includes handling of a range of problematic conditions. For instance, moving objects stop periodically (or permanently) and/or change their pose relative to any sensing group. It is not practical to carry knowledge of all possible objects of interest-including their phenomenology in each sensing modality for all the sensor-object geometries—on all sensing nodes responsible for monitoring an area of regard. Thus, in situ discovery of at least some requisite knowledge necessary for adequate DTCI performance is unavoidable. Handling the broad range of possible object behaviors and inter-object interactions also requires on the fly modeling and exploitation of such incrementally updated models.

Figure 6:
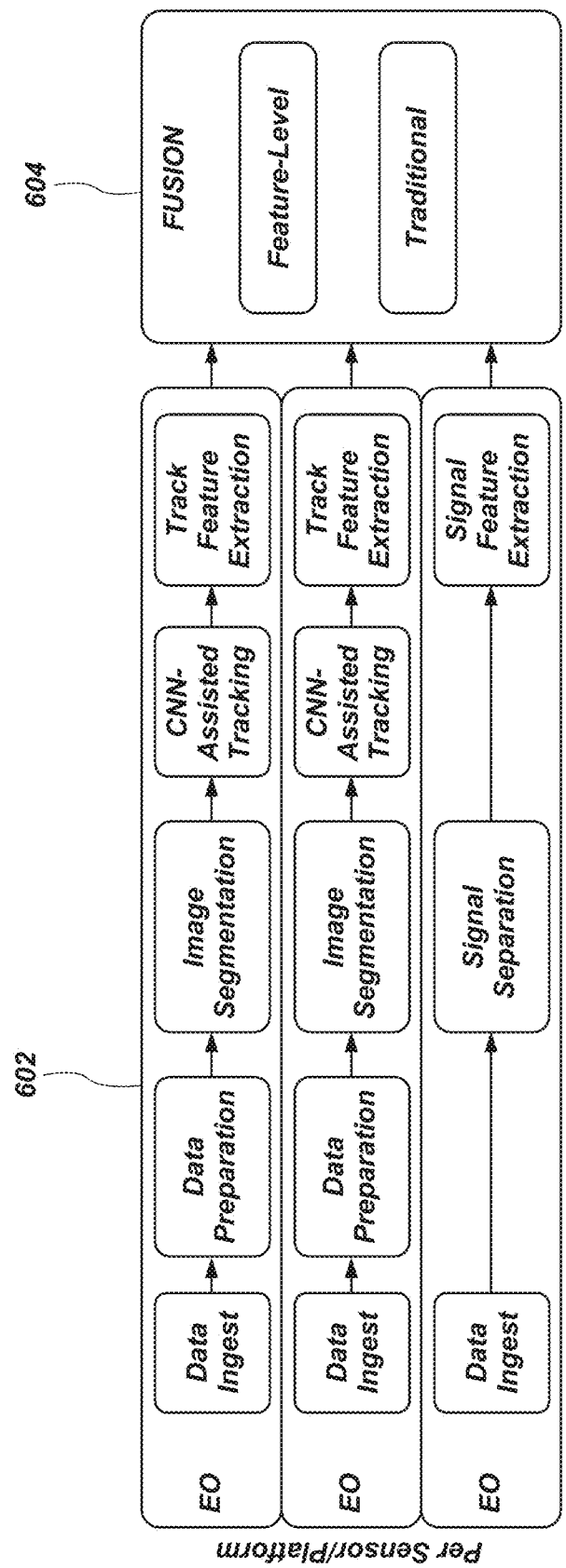
FIG. 6 is a block diagram illustrating an example of high-level architecture of processing pipelines hosting specific approaches for several sensing modalities followed by a feature-level fusion stage.

FIG. 6 illustrates the high-level architecture of processing pipelines hosting specific approaches for several sensing modalities 602 followed by a feature-level fusion stage 604. The pipeline may exploit the learned compact feature representations fused over multiple sensing modalities to perform DTCI of multiple object event signatures. Imagery processing may use a convolutional neural network (CNN) assisted tracking block. Collectively, the feature extraction approaches overcome the inadequacy of pre-defined features as a means for creating efficient, discriminating, low-dimensional representations from high-dimensional multi-modality sensor data collected under difficult, dynamic sensing conditions. Features extracted from these modalities feed the fusion component of the pipeline (FIG. 6, 604). Feature-Level fusion combines features across modalities and sensor nodes to create, and maintain over time, a composite representation of the multi-modal activity of each object in the scene.

The feature-level fusion approach may associate arbitrary tracked features using a Multi-Modal Deep Generative Networks (MMDGN)/infinite Gaussian Mixture Model (iGMM) combination. The MMDGN may consist of two layers. The lower layer is an extensible set of Deep Partitioned Autoencoders (DPAs). The upper layer is a single deep autoencoder that concatenates and compresses the outputs of each DPA hidden layer. Individual DPAs receive input data from a single modality on a single node. Recursively, DPA structure may mirror the MMDGN structure. Each autoencoder in a DPA's lower layer processes a subset of extracted features from a sensing source (e.g., kinematic, shape, optical flow, CNN-based features). The upper layer concatenates and compresses the outputs of each DPA lower layer autoencoder. Each individual MMDGN autoencoder, regardless of level within the hierarchy consists of an encoder and decoder networks. They share a hidden layer of a smallest dimension. Training minimizes the reconstruction error between the input data (at layer 1 of the encoder) and the output (at layer 1' of the decoder) generated by the autoencoder. Training of individual DPAs involves training each lower level autoencoder first with a set of manually associated tracks. Training the upper level follows using the hidden layer outputs of the lower level autoencoders. Upon completion of DPA training, DPA hidden layer outputs become training inputs to the upper level autoencoder. MMDGN structure and training is therefore modular and extensible. It is straightforward to add nodes, modalities, and feature extractors. MMDGN upper-level retraining is the place where such extensions have an impact.

A trained MMDGN sets the stage for GMM inference. An iGMM is a special case of Dirichlet process mixture, which allows the number of mixtures to approach oo in the limit. This iGMM learns the difference between correct and incorrect inter-source (e.g., cross-modality, cross-node for a single modality) track associations in a compact probabilistic representational space. Correct association examples create positive iGMM clusters and incorrect association examples create negative iGMM clusters.

FIG. 3 illustrates the combination of the multi-modal fusion approach 302 presented with the active sensor management 304 concepts presented in a closed-loop system. FIG. 1A illustrates a local processing module 102 that performs upstream fusion processing on ownship multi-modal measurement level sensor data and embeds results into the joint probability space (that encodes all the information available to the host node; FIG. 3 306. An interaction processing module adds new information from other nodes into the MMDGN representation of the joint space (FIG. 1B, 306), resulting in that node's manifold representation of detections from the environment. Tracking, Classification, and Identification processing over the joint feature space for each detection characterizes detections by type, activity, behavior, etc., by exploiting inter-modal dependencies. Ownship DTCI fusion outputs guide the Ownship Active Node/Sensor Management Controller update of sensors control parameters. The latter aims to maintain internal and external situational awareness despite sensing degradation of sensor data from sensors by changing the sensor control parameters to improve sensor input. An interaction module mediates inter-node communication and optimization to ensure optimal observation of a target by a team of cooperating HSN nodes (e.g., UASs (unmanned aircraft systems), UGVs (unmanned ground vehicles)).

Figure 7:
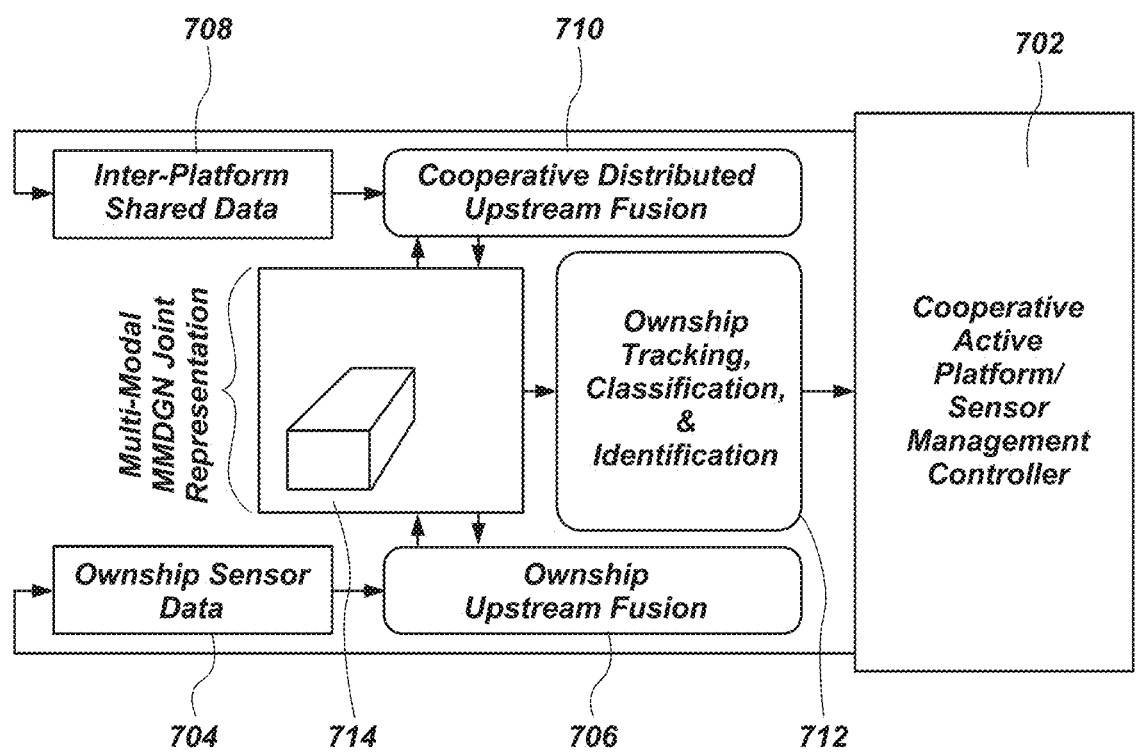
FIG. 7 is a block diagram illustrating an example of an upstream fusion module and inter-sensor node shared data.

FIG. 7 compactly illustrates these elements and their interactions. To achieve ownship DTCI a sensor management controller 702 can feed ownship sensor data 704 to an ownship upstream fusion module 706 and inter-platform shared data 708 with a cooperative upstream fusion module 710. These modules may update the MMDGN representation 714 accordingly. An ownship TCI module 712 can process this evolving representation to provide that platform's assessment of the situation to the controller.

Tensor Regression Meets Multi-Modal Deep Generative Networks (MMDGN)

Figure 8:
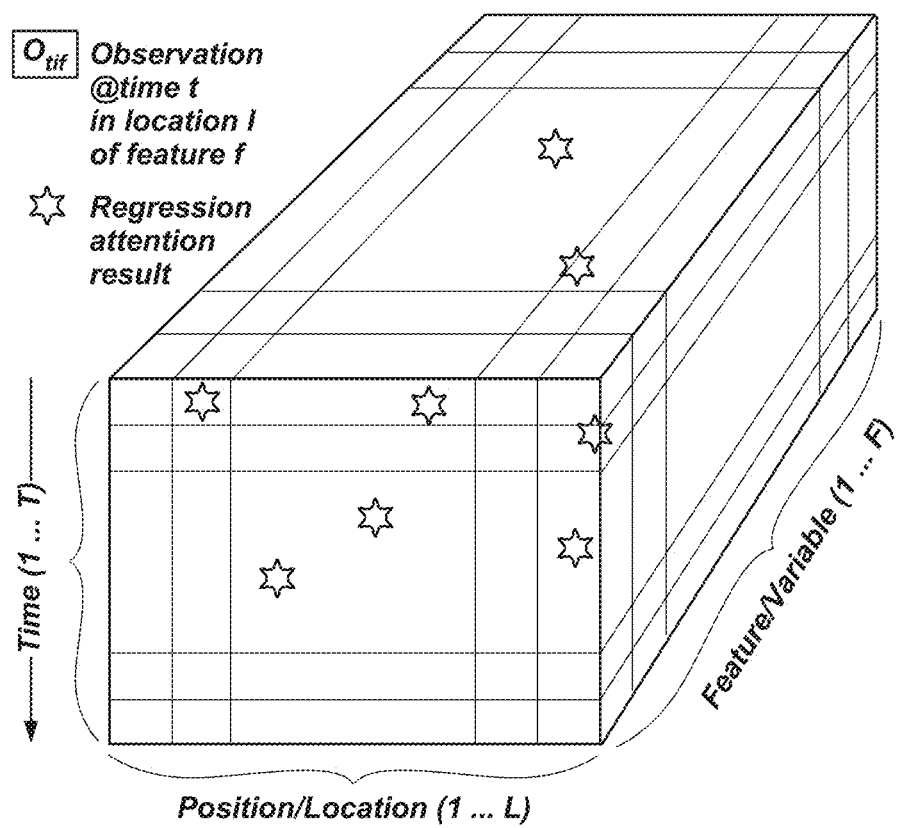
FIG. 8 illustrates an example of a joint feature space that include one possible tensor representation of sensor data in support of data fusion.

High-order correlations exist in multimodal data collected by a single moving sensor or a team of small unmanned air systems (SUAS). Finding the correlations in large amounts of streaming data can be challenging. For instance, data generated from a sensor network contain measurements from different time-stamps, locations, and sensor modalities (i.e., features/variables). FIG. 8 illustrates one possible tensor representation of sensor data in support of data fusion (FIG. 6, 604). To address this challenge, an automated mechanism (either mathematically defined or machine-learned) may simultaneously capture correlations across time, space (aka place/location) and modality (i.e., feature/variable). This approach includes a tensor regression model of high-order structure in the data while imposing low-rank structure for dimension reduction. In essence, this approach leverages cross-modality feature production via low-rank tensor approximation to account for cross-modality contextual correlations. This accommodates measurement and higher dimensional (e.g., high dimensional tensors) input data. Tensor regression has several advantages over vector or matrix regression. First, from the modeling perspective, the model tensor provides an explicit parameterization for the multi-directional interdependence among variables. Second, the low-rankness represents the shared latent space in the data. Third, from the learning perspective, tensor model enjoys lower sample complexity. And fourth, the tensor low-rank constraint regularizes the model to be more generalizable. The result is a more compact, abstract, accurate target representation relative to representations from conventional approaches (e.g., approaches that extract phenomenology-based features for each sensor modality, e.g., image-based kinematic features, image-based shape features, SIGINT (Signals Intelligence) signal spectral spread, signal entropy, and signal energy). This type of representation may improve downstream processing performance (e.g., target class discrimination and activity recognition)— especially in challenging data collection environments.

One useful element in multivariate spatio-temporal analysis, as used, e.g., for image data processing, is an efficient way to incorporate spatial-temporal correlations into the modeling approach. This is used to automatically capture shared structures between single modality measurements (e.g., all pixels in an image frame, all range-doppler cells, power spectral density within each frequency bin of RF (radio frequency) spectrograms) across sensing modalities while preserving location and time relationships. Prior models for upstream multimodal fusion assume simple interdependence among features, space, and time within the sensing modality, and focus on capturing correlations between modalities.

In contrast, this fusion model can extract correlations among single modality features over space, time and across multi-modal data. This may be done by extending the unified framework that features the MMDGN approach for multivariate multimodal spatio-temporal upstream fusion. This tensor-based representation then feeds the existing multimodal MMDGN to succinctly represent the spatio-temporal evolution of the joint multimodal manifold representation of the input measurement data. Tensor decomposition reduces the model complexity by jointly approximating a sequence of multivariate multimodal measurements as a low-rank tensor-train factorization. Tensor decomposition not only avoids the exponential growth of model complexity, but also introduces an 'information management' aspect that facilitates effective representation learning. This processing pipeline extension may outperform prior approaches, while using only a fraction of the current parameters. This may dramatically improve the quality of shared information within the cooperative decentralized fusion approach.

FIG. 8 illustrates a tensor representation of a platform's observations arranged along extensible time, space (i.e., position/location) and modality (i.e., feature/variable) dimensions. This depiction presents time, space and modality along the vertical, horizontal and depth axes respectively. Low rank tensor regression approximation results (stars in FIG. 8) capture cross-modality contextual spatio-temporal correlations between observations. The result is compact, abstract, accurate representations of elements of interest (e.g., targets) in a scene.

Cooperative DTCI

This decentralized information exchange performs on-line decentralized/distributed (i.e., in-mission) adaptation to learn what and when to communicate with other sensor nodes (agents) based on observed effects of exchanges on swarm performance while explicitly accounting for communication channel bandwidth constraints and dynamically changing communication topology preventing constant, complete exchange of information. In addition, this approach closes the loop between motion control and planning for a swarm to increase the value of information obtained by multimodal upstream data fusion leading to higher accuracy of decentralized, on-device multi-target classification.

The cooperating HSN SUAS nodes may exchange their compact local MMDGN models (e.g., an autoencoder-based MMDGN that learns abstract feature representations over multiple hidden layers from multimodal spatiotemporal input data) with their neighboring sensor nodes on a time-varying communication graph that is much sparser than a complete graph and combines them using the collective processing MMDGN. Given the new multimodal measurements observed by the $i^{th}$ sensor node at time step k, the distributed and decentralized approach generates the aggregate posterior probability distribution of target behavior (i.e., shared manifold representation) as perceived by each individual node. This approach may be extended by considering the problem of coordinating behavior between cooperating SUASs to execute maneuvers increasing the probability of event detection, target classification, and estimation and prediction of target location using multimodal and multi-node observations.

Each sensor node has limited power resources to support multiple functions, including sensor operations, on-board low-power signal processing (i.e., event detection, target classification, and estimation and prediction of target location), and communication with neighboring nodes. In order to coordinate behavior between HSN nodes to maximize the classification performance this technology may use decentralized adaptive network-flow optimization utilizing power-efficient sensing modalities, asynchronous sampling rates, and efficient communication protocols to exchange summary information among nodes. For example, individual nodes sample and process raw signals, but do not directly communicate these signals over the wireless channel. Instead, each node extracts relevant summary statistics from raw signals, which are typically of smaller size. Individual nodes may store the summary statistics and transmit them to other nodes as warranted.

This technology may use an adaptation of the decentralized adaptive network-flow optimization algorithm that combines binary integer processing methods with fuzzy decision-making processes to obtain solutions to resource allocation problems. In existing resource allocation methods, there is a large burden on accurately specifying multi-objective cost functions associated with tasks that are carried out as flows on arcs through the network. Fuzzy decision theory models these multi-objective cost functions and constraints, in order to capture imprecise conditions associated with decision making under constraint feedback information (e.g., communication delays and sporadic node connectivity). Efficient processes may obtain solution sets of binary decision variables.

EXAMPLES

Reinforcement learning and game theory can be used for effectively orchestrating a HSN, improving sensor data fusion, and enabling autonomous decision-making in real-time surveillance scenarios. The development of processes that allow a multi-node HSN to fully achieve situational awareness (SA) autonomously over an area of interest (AOI) is a problem of great interest and difficulty. For a system to be effective, it may have situational awareness (SA) at multiple scales. The system may have SA at the individual HSN nodes and across the entire HSN. For example, solutions must both allow a pan-tilt-zoom (PTZ) electro-optical (EO) camera to manipulate each of the three (PTZ) parameters to accurately detect, track, classify, and identify (DTCI) objects of interest, while the sensor nodes must communicate with one another to ensure that all objects of interest are detected, tracked, classified, and identified to maintain track custody for as long as possible or desirable.

Sensor node negotiations may lead to nearly optimal assignments of sensors to targets as scenarios evolve over time. Through the negotiation strategy, sensor nodes reach consensus on the state of each target, achieving efficient feature acquisition and efficiently executing various performance criteria such as tracking accuracy, comprehensive area coverage, and sensor resolution.

Figure 9:
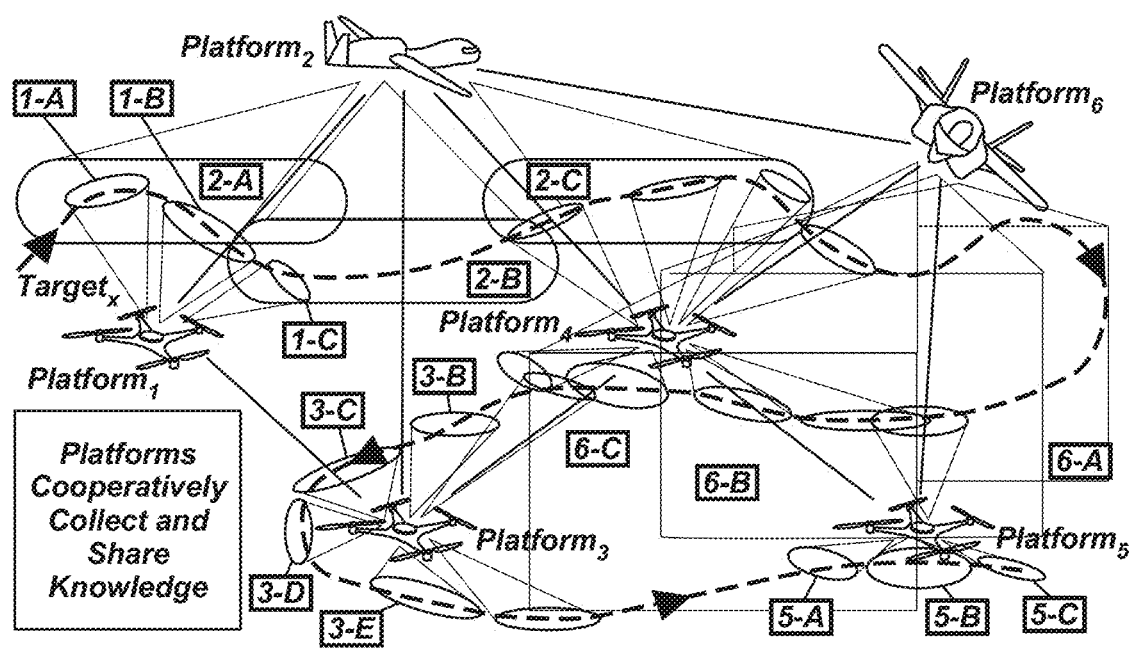
FIG. 9 illustrates an example of coordinated data collection from heterogeneous sensors.

Bringing the local and cooperative control and fusion elements together enables the type of scenario illustrated in FIG. 9. Here $Target_x$ enters the area of interest (AOI) from the west (Top Left) and traverses the AOI following the dashed line (which represents ground truth for $Target_x$). A network of heterogeneous sensing nodes (Platform through $Platform_6$ (or $Node_1$ to $Node_6$) form a dynamically configured HSN) monitors behavior within this AOI. Although Platforms 2 and 6 are not SUASs, they illustrate large UAS and/or occupied air nodes and potentially ground, maritime, and/or space domain nodes that can participate as in the HSN described in this technology. HSN nodes can communicate across a dynamic topology indicated by the black lines and connectivity across this topology may be sparse. Elliptical, rounded rectangular, and rectangular sensor dwells illustrate the coordinated control of different sensing modalities evolving over the time course of $Target_x$'s AOI traversal (as indicated by the callout boxes—e.g., 1-A→1-B→1-C for $Platform_1$, Top Left). Although complex, FIG. 9 depicts only a single target within a potentially very active scene that may include many stationary and many moving targets. The sophisticated cooperative combination of node and sensor management and distributed upstream fusion across all HSN modalities offered by a flexible, closed-loop system can extract a high level of useful information from and identify subtle activity in such scenes.

The system illustrated in FIG. 9 may coordinate data collection from heterogeneous sensors hosted on different types of airborne platforms to maximize DTCI performance of the system against elements of interest operating within the scene. Upstream fusion across modalities and sharing of fused target representation enhances network platform topology and sensor configuration to reduce ambiguity and increase confidence in DTCI outputs.

Figure 10:
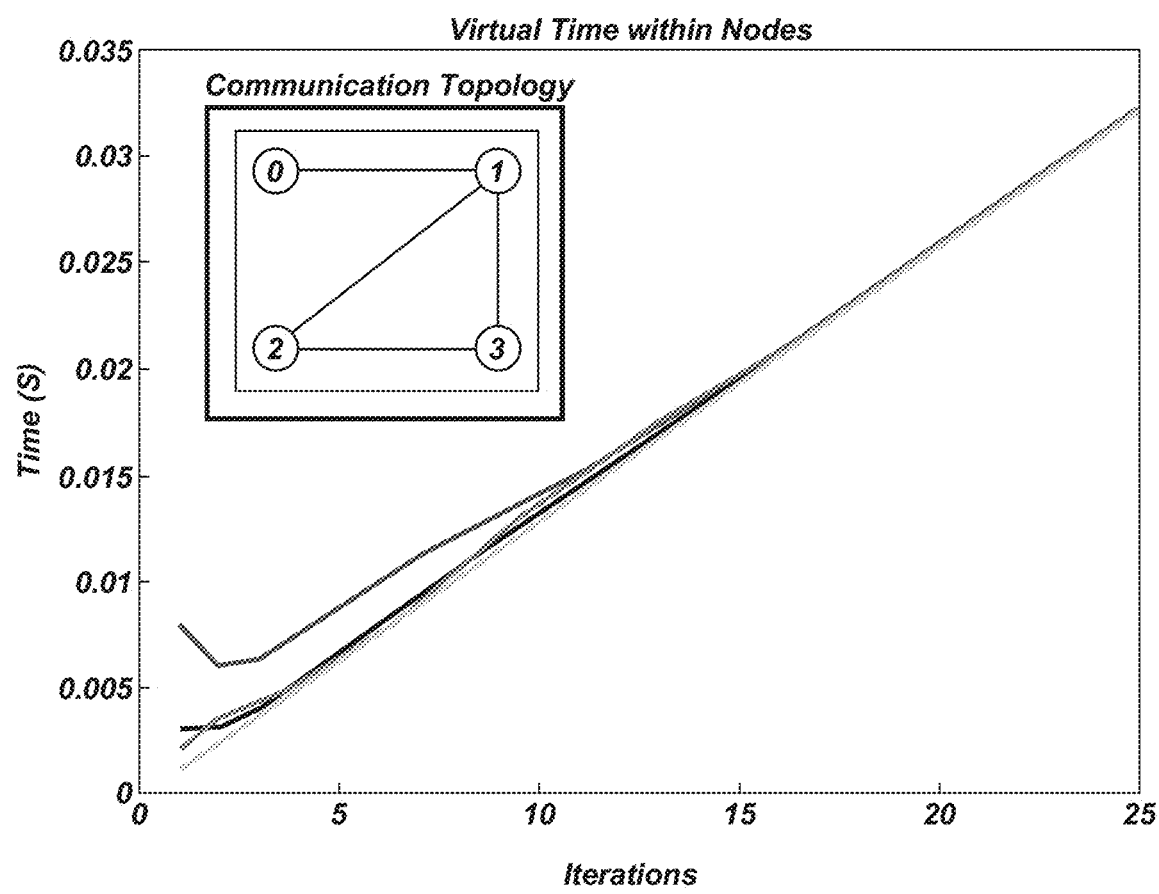
FIG. 10 illustrates example of simulation results from the consensus approach applied to the problem of synchronizing time across a small network of nodes with dynamic communication topology.

FIG. 10 illustrates simulation results from this consensus approach applied to the problem of synchronizing time across a small network of nodes with dynamic communication topology. Over a small number of iterations (x-axis), the respective, initially disparate node time values (y-axis) converge to a common value. Thus, a cooperative distributed consensus protocol synchronizes clock values (y-axis) in a four agent HSN to achieve coordinated observations (x-axis) after 15 optimization steps. Although time synchronization is a much simpler problem than aligning scene understanding and collection plans, this result demonstrates approach for achieving desired HSN behavior.

Figure 11:
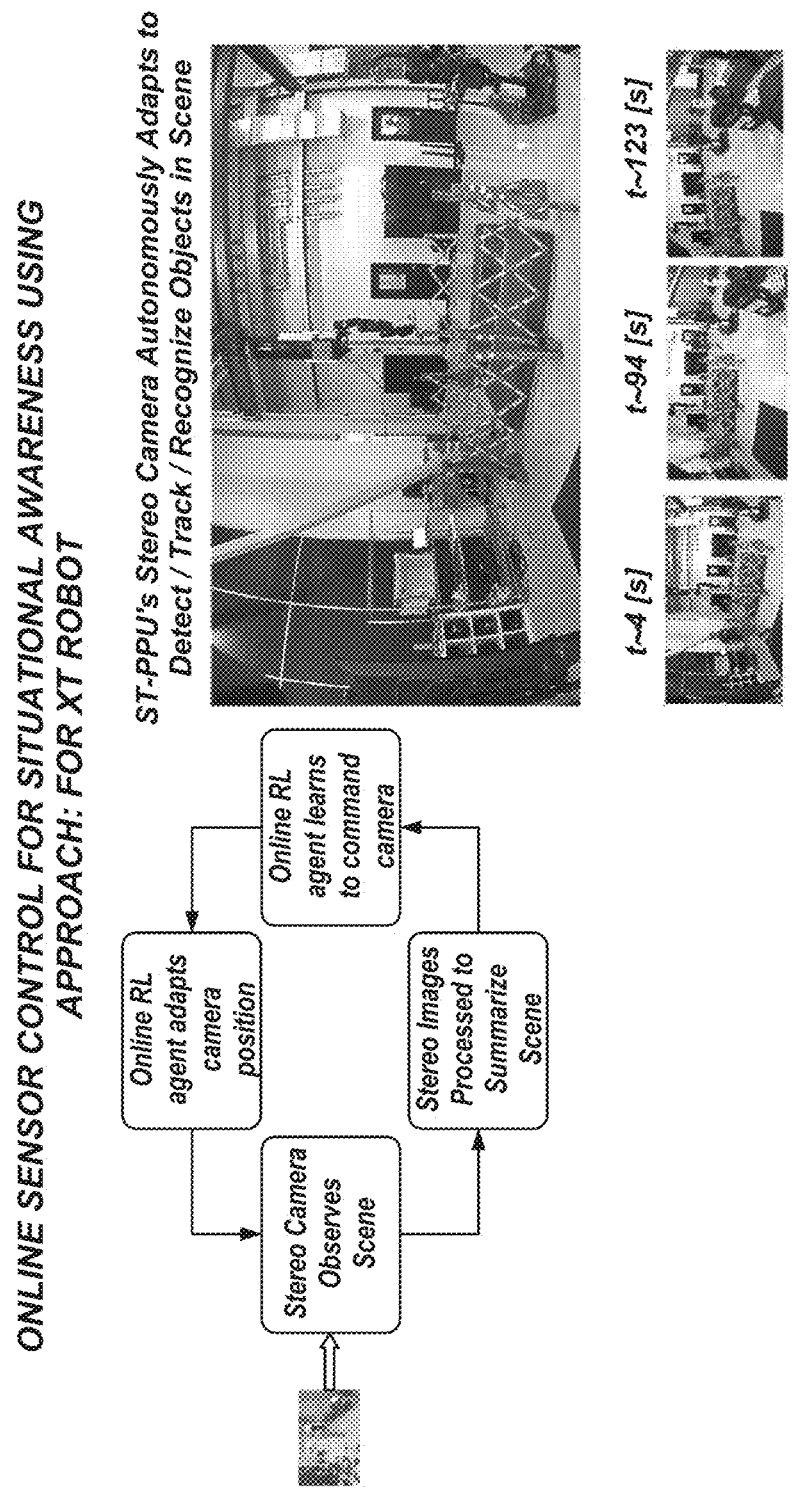
FIG. 11 illustrates an example of online sensor control for ground based robots.
Figure 12:
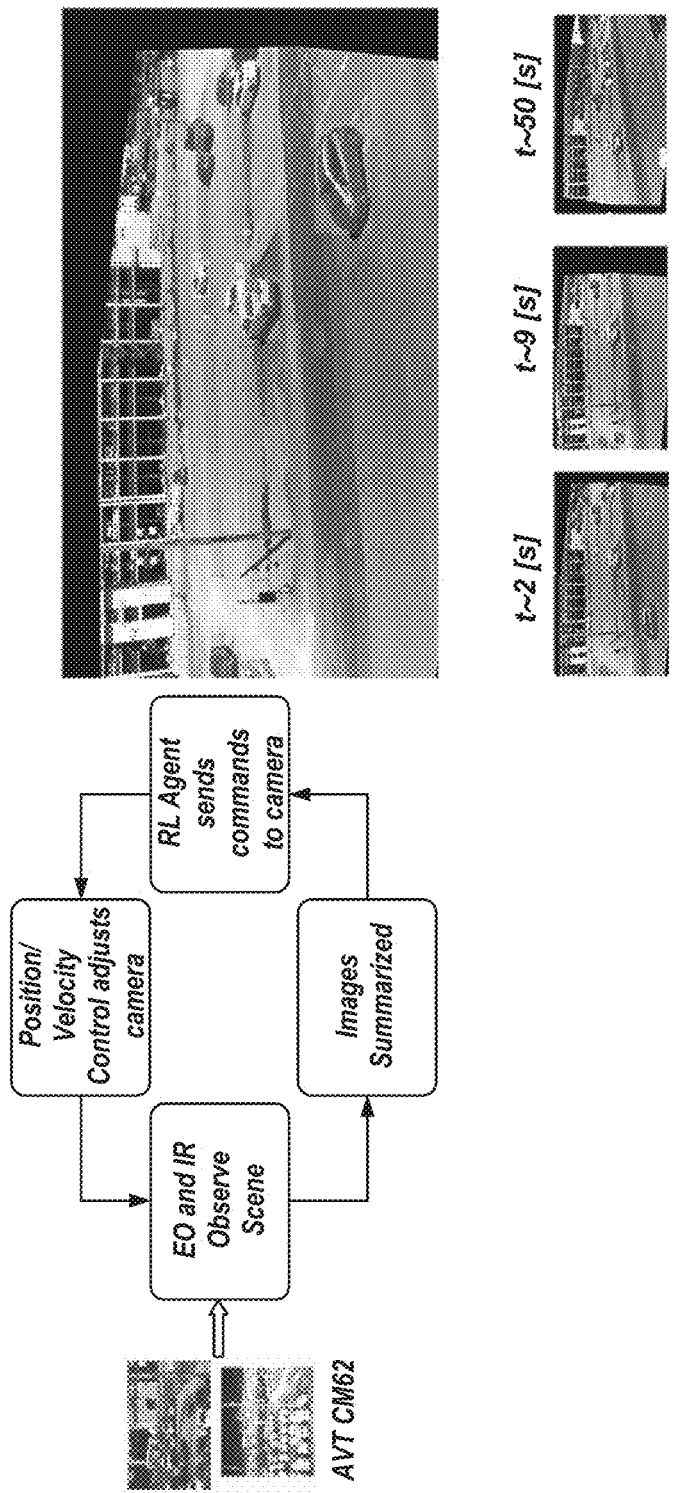
FIG. 12 illustrates an example of online sensor control using a reinforcement learning (RL) approach for unmanned aerial vehicles.
Figure 13:
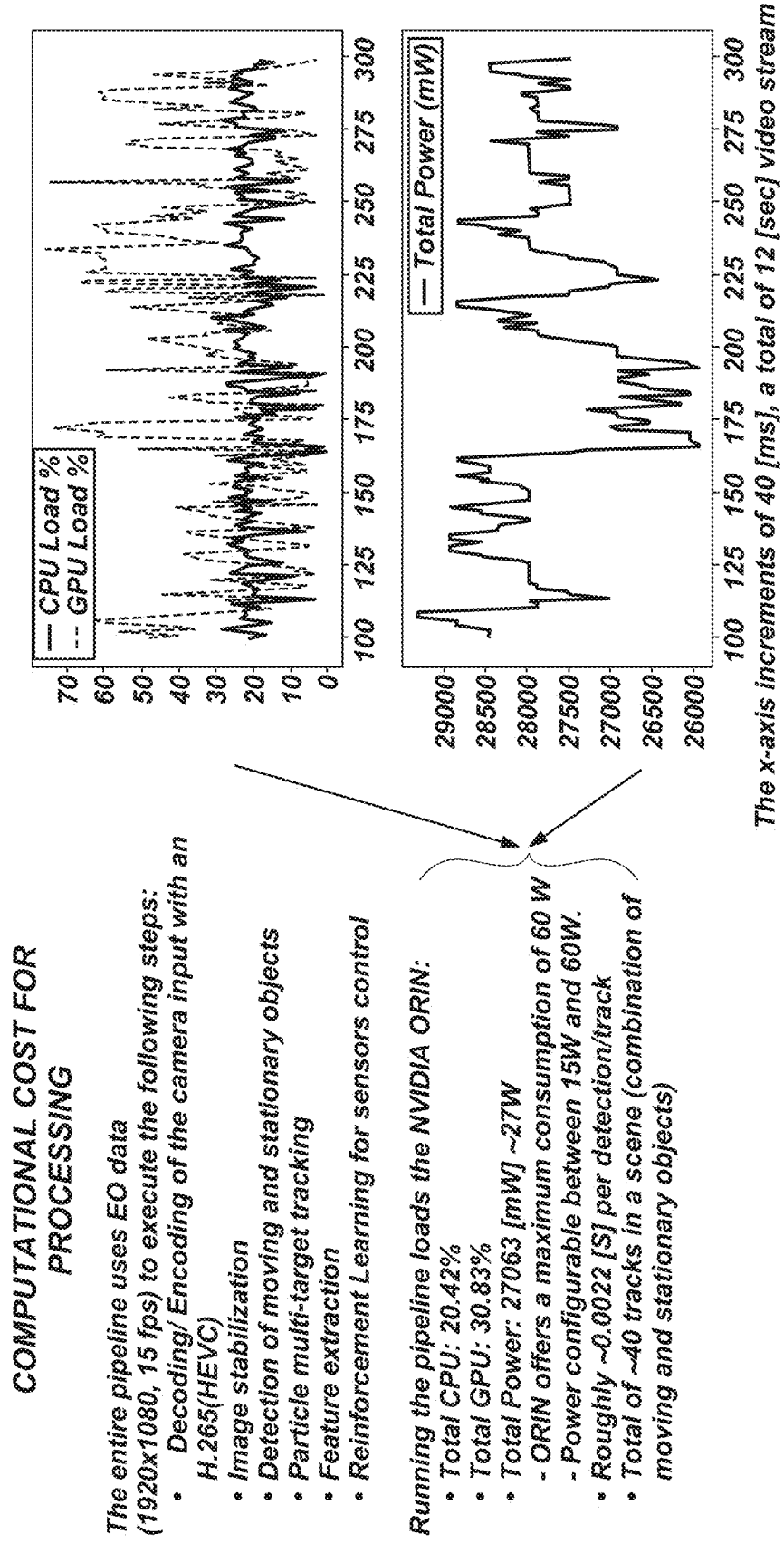
FIG. 13 is a chart illustrating an example computational cost for sensor node processing.

FIG. 11 illustrates an example of online sensor control for ground based robots. FIG. 12 illustrates an example of online sensor control using a reinforcement learning approach for unmanned aerial vehicles. FIG. 13 is a chart illustrating an example computational cost for node processing.

This technology may use Online Kernel Least Squares Policy Iteration (OKLSPI, an online reinforcement learning method combining dictionary learning with classical Q-learning) operating over a fusion pipeline to track output controls for a multi-modality sensor node (consisting, e.g., of a pan/tilt/zoom electro-optical camera, a radar, and passive radio frequency sensor) to maintain persistent surveillance of objects of interest. Learned OKLSPI policies offer significant generalization ability, with a sensor node being able to successfully track an observed object well past the observed training period. OKLSPI significantly outperforms alternative RL approaches (such as Proximal Policy Optimization (PPO)) in terms of mean track duration by up to 4 times. Whereas OKLSPI was able to maintain track well beyond training example durations, PPO was unable to maintain track for training example durations. More details about the use of the OKLSPI process in the present technology may also be found in the paper entitled "Multiagent Reinforcement Learning and Game-Theoretic Optimization for Autonomous Sensor Control" by Ravier, Garagic, Galoppo, Rhodes, and Zulch which is incorporated by reference in its entirety in this description. FIG. 14 illustrates a table with mean vehicle track duration.

In one embodiment, the OKLSPI process may use state-action pairs. As the state-action pairs are observed, the resulting computations only affect the state-action pairs in the dictionary that most closely resemble the observed one. This allows for much faster computations downstream in the process, as well as empirically observed faster learning rates.

In one configuration, OKLSPI state-action pairs may be related by Euclidean distance. Alternatively, the state and action spaces may be metric spaces (e.g. sets for which there is some notion of distance that need not be Euclidean). This allows for many other types of state-action spaces than just a Euclidean space. For example, a metric space of the unit quaternions might be used.

In another embodiment, a variant of OKLSPI used can employ a process to prune the underlying dictionary. The OKLSPI process inherently assumes that the Q-function is well-approximated by elements in a dictionary that are gradually learned. Over time, as more objects are added to the dictionary, computations at the individual steps of the algorithm become more intensive, and redundancy of dictionary elements increases. To decrease computational burden and mitigate redundancy of the elements of the dictionary, we can employ a refinement/subsampling procedure to only retain the most important elements of those observed in the dictionary thus far. This refinement procedure both sub-selects elements of the dictionary to keep and recomputes all relevant quantities in the algorithm so as to account for the loss of the redundant elements and maintain all information learned thus far.

Previous variants of the OKLSPI process used a particular maximization step. The original OKLSPI paper proposed selecting the next action based on a brute force maximization of a particular functional. In other words, for each possible action (the number of which could be computationally intractable), the algorithm would compute the value of a function for that particular action, and would select the action that gave the maximum value AFTER computing the value for all possible actions. For even small problems, this induces an unnecessary computational burden. Given the underlying form of the objective function employed, which allows for analytic computation of both gradients and Hessians, this technology allows for the possibility of a quicker action selection by instead performing a continuous optimization algorithm (such as gradient descent, coordinate descent, Newton's method, BFGS, L-BFGS, ADAM, etc.) to quickly compute the next action rather than rely on brute force iteration.

The OKLSPI process has also used an equation involving a matrix inverse. This process methodology replaces the matrix inverse with an iterative procedure for solving a system of equations as in the paragraph above. This significantly reduces computational burden and allows for learning of much richer RL policies.

In the past, the dictionary used with OKLSPI has been arbitrarily initialized. In this technology, a general initialization of the dictionary has been shown to assist in learning. Specifically, the dictionary may be initialized by first computing an intelligent subsample of the state-action space as a whole. This intelligent subsample is prepared by sampling the entire state-action space based on known information at the time. The dictionary may be initialized with the subsample and the sub-sample can be used to start the process. Such sampling need not be done uniformly, but may also be based on the underlying curvature of the state-action space, or a combination thereof. Such dictionary initialization has been shown to be valuable, because without using this initialization, the resulting RL policies may fail to converge after training to something usable. The modifications to OKLSPI above, may improve the underlying context of the RL algorithm.

Figure 15:
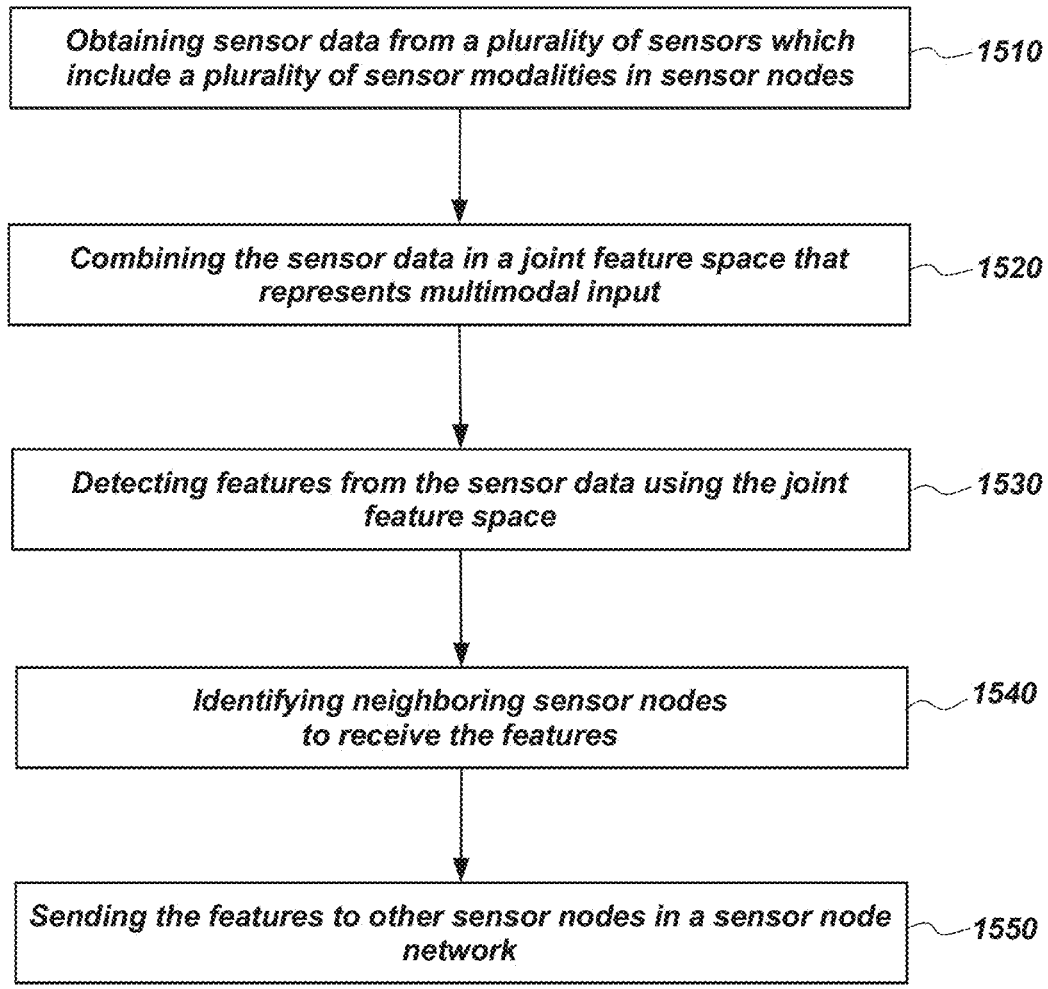
FIG. 15 is a block diagram illustrating an example of a method for controlling a heterogeneous sensor network.

FIG. 15 is a block diagram illustrating an example of a method for controlling a heterogeneous sensor network. The heterogeneous sensor network (HSN) can be used to provide situational awareness, intelligence operations, surveillance operations, commercial security operations, reconnaissance missions in military or police operations or other detection, tracking, classification, and identification (DTCI) for various applications. The HSN may use multiple sensor nodes with two or more multi-modal sensors. For example, the sensor nodes may be moving vehicles with multiple multi-modal sensors or the sensor nodes may be fixed sensor nodes. The reason for using multi-modal sensors on a single node is that when data from those sensors is fused and processed, this may result in better DTCI.

The method may include obtaining sensor data from a plurality of sensors which include a plurality of sensor modalities for the sensor nodes, as in block 1510. The types of sensors that may be used may include: cameras, Lidar, radar, RF sensors (SIGINT sensors), or other sensors as discussed earlier.

The sensor data may be combined in a joint feature space that represents multi-modal input, as in block 1520. More specifically, the spatial position data of features may be correlated by time and modality type in the joint feature space from the sensor data of a sensor node. This may result in a fusion of information from the sensor data to enable storage of a high level representation of the features over time and by different modalities. Groupings of features may be collected for time periods and over the various modalities. The joint feature space can be used to detect, track and classify the features.

The sensor data from different modalities can be examined to see what each modality reveals about the feature or object identified. For example, each sensor type (e.g., radar, sound, infrared, visible images, etc.) may reveal different aspects about the features detected. This joint feature space may be a compact representation because the joint feature space does not store raw data from the sensors, such as imagery and sound for the objects or features detected. In one example, low-rank tensor regression may be applied to sensor data from separate sensor data modalities to enable discovery of cross-modality contextual correlations that are features in the sensor data from the plurality of sensors.

Another operation may be detecting features from the sensor data using the joint feature space, as in block 1530. The fused information may be presented over the joint feature space, and this fused data may be used to perform the tracking of moving and stationary objects in the environment.

This information from the joint feature space can be used to control the sensors on the sensor node. For example, reinforcement learning may be used to determine if features are currently being identified. If not, controls for a camera may be modified, including, for example: change pan, tilt, and zoom of the camera. Similarly, a sensor node may receive feedback from the reinforcement learning, to change the waveform of the radar in order to increase the DTCI on the ground.

The use of the sensor information for modifying the controls of the sensors can create a closed loop. The sensor node initially observes the information. Next, the information from sensor data may then be fused together and then the features may be extracted from the multi-modalities fused together in the joint feature space. The fused data and the detection of features may be used to perform DTCI. This data may be used as feed back into the controls of the sensors (during a search function of the reinforcement learning) and the sensors can be adjusted to improve the DTCI. For example, this allows the sensor node to focus on or track a specific object or item.

The sensor nodes may observe the environment using multi-modal sensors. Then fusion may be used to combine the sensor data to correlate features, and this enables the extraction of features from camera data (e.g., images), radar data, communication sensor data or other sensor data. As discussed, the sensor data from multiple modalities may be combined in the joint feature space. The modalities may be represented along one dimension of the joint feature space, time may be represented on a second dimension and space may be represented on a third dimension of the joint feature space. Due to the use of multiple modalities, if a camera is obscured, for example, then features from a radar sensor or another sensor can be used for DTCI. In another example, communication sensors can be used, and the sensors can detect that someone is talking in the phone in the vehicle and this detects and identifies an aspect of the vehicle. In another example, radar can detect features through fog. Fusing data across multi-modal sensors is useful because multiple modalities can be combined to provide additional information that may then be used for DTCI.

Neighboring sensor nodes may also be identified to receive the features, as in block 1540. A further operation may be sending the features to other sensor nodes in a sensor node network, as in block 1550. The features may be sent to other sensor nodes that are neighbors within a communication neighborhood when a feature is available. A neighbor may be defined as a sensor node with a direct communication link to the sensor node. Alternatively, a neighbor may be defined as any sensor node that is N (e.g., 1 to 3) network packet hops from the source node. The sensor node network may be a heterogeneous sensor network because the sensor node network may account for sensor nodes containing high-resolution (more expensive) and low-cost multimodal sensors. In one embodiment, different types of heterogeneous nodes (e.g., planes, drones, helicopters, ground vehicles) with varying sensor collections may be used in the sensor node network. In an alternative embodiment, the sensor node network may have many duplicated types of nodes (e.g., a fleet of the same drones) that each have the same set of heterogeneous sensors on-board, and in this configuration, the nodes in the sensor node network may be considered to be homogenous but the sensors are heterogeneous.

Multiple sensor nodes can work collaboratively and exchange information to control cooperation between the sensor nodes. The sensor nodes may exchange information to avoid a field of view overlap between sensors. The system may define what information will be exchanged. For example, features may be detected from the fused data and features may be exchanged rather than large amount of raw sensor data (e.g., image data). This feature data may be shared intermittently or on a periodic basis that keeps the data transfer rates low. When a sensor node identifies features, the features may be the only data shared with the other nodes. The sharing of the data between sensor nodes can also improve detection, tracing and classification and identification.

The sensor nodes can observe the environment using sensors, identify the features in the environment and act to change the control settings of the sensors on a single node. These features may be repeated across multiple nodes for continuous coverage in the sensor network. The computing is performed in a single node in real-time and the single node may have sensors with a limited range or field of view. The processes used on the sensor nodes may be computationally efficient because the sensor nodes may be compute, power and bandwidth constrained. For example, the processes described may be placed on a relatively small UAV or asset that has limited data processing, power and payload.

The sensor nodes may use online reinforcement learning (RL) with an in-situ training process to adapt sensor control parameters. A reward function may modify the sensor control parameters until some features related to events captured in the sensor data are detected, tracked and classified. The reinforcement learning (RL) approach may be used to control and/or adapt sensor parameters to increase the value of information (e.g., identify features) obtained by the sensors captured from the environment.

Information in the joint feature space may be used in the reinforcement learning. The reinforcement learning may develop the reward or value function as information is perceived. The system may be detecting and tracking features for objects, which may provide a positive reward. If there is nothing to detect, then a negative reward is provided and the sensor node will start a search function and move the sensors or the sensor node in space until detections of features occur. The classification is looking for a pre-determined pattern and then if the classification is found or a feature is found, a reward is obtained. This process is based on the value information that the sensor node detects and observes (entropy based).

As described, when the sensor node does not detect any feature, then the RL process of the sensor node starts to explore. For example, with a camera, the pan and tilt may be moved for exploration. Radar can be adjusted similarly. When the sensor node finds a feature (e.g., a vehicle, a bird, a plane) then a reward is received. The pattern for a classifier for a high value target may be pre-defined in advance. For example, the pattern may be defined by intelligence from the military or for a specific application (e.g., security sensors tracking vehicles or humans). Accordingly, the sensor nodes can allocate or move sensors to objects in a multiple vehicle scenario, minimizing the discontinuity between the sensors and enabling better continuous coverage of activities and features in an area of interest (AOI). An approximate value function may be used as an approximation for a reward function or the Q value function, as described earlier.

The RL approach may also receive information from other sensor nodes in the sensor network in a distributed way, then the information from other sensor nodes (e.g., players in game theory) that see the scene from other perspectives may assist in the sensor node's estimation of the scene. This inter-node communication allows the RL of the sensor node to process sensor data from the decentralized multi-node swarm and receive the benefit of collective collaboration. Furthermore, the heterogeneous sensor network may use less expensive sensors because the sensors when used jointly provide better aggregate information.

Game theory may be applied to influence a focus of the reinforcement learning agents of the sensor nodes. A non-cooperative differential game, consensus negotiation protocol and distributed messages may be used for determining a global sensor network desired utility function. Game theory may be used by the sensor node to select which of the sensors (and features) the sensor node wants to use from other sensor nodes and then through consensus the sensor node may negotiate in order to improve the sensor node's own reward as part of the cooperation. In the applied game, each agent may be selfish and want the maximum coverage from the sensor node's perspective. If the features received from other sensor nodes helps the sensor node, then the node uses that input. The sensor node can decide which information from the other sensors to use to increase the reward using game theory. Each sensor node is viewing the scene from a separate perspective. If the information can be used to improve the sensor's perception of the scene then the sensor node will use the data, otherwise the data may not be used. Accordingly, game theory may be used to determine, given observed features from multiple platforms (e.g., nodes or vehicles), which observed features are specifically relevant to any one particular platform in order to focus on the relevant features and ignore the others. For example, if the sensor node receives data from sensors, the sensor node may use information from sensor 10 because it increases the reward but sensor 2 does not help the sensor nodes perspective due to where the sensor node is in the environment. In a second example, assume that Platform A observes 23 objects and would like to increase its own reward, but cannot increase its own reward by tracking or "following" all 23 of the objects. Platform B may observe 8, with 7 of those coinciding with the observations of Platform A. Game theory can be used to figure out which of those 7 they have in common so the nodes can reallocate which object Platform A should track and which Platform B should track, and the desired outcome for each node is maximizing their respective reward. Using game theory allows the sensor node to decide what information is relevant to each sensor node (e.g., player) in order to increase their own reward. This selfishness in the game provides a better reward for the collective too.

In one configuration, a notification may be received that a communication link has terminated on one or more sensor nodes. The sensors nodes may then play an assignment game the using remaining communication links. The game may be used so that the sensor nodes can operate their RL agents to allow the sensor nodes to continue to maintain situational awareness. The game may use utility functions with Nash equilibrium for a game allocating targets (e.g., features) to the sensors involved in the game. This guarantees that, when allocating sensor network node resources to targets, that no target information needs to be lost unless explicitly desired.

This sensor network does not use centralized processing that is expensive and is prone to fail due to the communication links failing, because each node performs its own tasks. A loss of communication between sensor nodes does not cause the sensor network to fail. The information or features communicated between the sensor nodes may increase the overall robustness of the sensor network. In this technology, game theory may be used to influence the focus of the RL agents to enable responses to dynamic changes in network topology.

The present technology may be used for many types of applications. One type of application may be tracking one or more objects in any environment. Another application may be for security and tracking of movement. The sensor nodes may also be used in warehouse applications, safety applications, self-driving cars, mapping operations, creating situational awareness for a robot to improve safety, and other similar applications. For example, in the robot safety scenario, the robot can identify features or items in the environment while the robot is performing physical functions, and then the RL processes may control the camera in order to focus on the feature or object. The sensor system may then provide a warning to stop the robot or the robot can warn surrounding humans of danger.

In another application, the heterogeneous sensor nodes can detect humans in a sporting scene. There may be multiple cameras stationed statically or dynamically around the environment for a sporting space. Adjustment to the controls of the cameras may provide coverage of the entire game and the multiple sensor nodes may capture camera and audio footage without missing events in the sports game.

Inferential Sensing

The multi-node system may sense features based on detecting the response of elements (i.e., physical elements) in the environment to the presence of the feature being sensed and tracked. The elements may be objects such as smoke, water vapor, vegetation, water, soil, air currents, street signs, tire tracks or other detectable elements. For example, the response may be a movement or a state change of an object, such as: smoke, vapor, water, plants or other detectable elements. In addition, a human or animal (e.g., dog) in the sensor data may be recognized to identify what the human or animals in the environment are focusing on and the system can use that inferential signal to focus on a feature. For example, a direction that one or more people are moving away from a feature (e.g., a tank or a person) may indicate where the feature is located. This allows an analysis of things that have focused attention on a location or object that cannot be directly viewed and these other objects can be used to direct focused attention on the feature. In another example, a vehicle may be tracked that disappears from a line-of-sight sensing, but the node can still track the vehicle based on the way other parts of the "space" or objects react in ways that indicate the vehicle's presence indirectly.

To summarize to some extent, this technology provides closed-loop synthesis of reinforcement learning for active sensor/node control and low-rank tensor correlation upstream fusion to enhance detection, tracking, classification, and identification (DTCI) by a distributed heterogeneous sensor network (HSN). The present technology may use a decentralized information exchange that performs on-line decentralized/distributed (i.e., in-mission) adaptation to learn what and when to communicate with other nodes (e.g., agents) based on observed effects of exchanges on swarm performance. The decentralized information exchange can explicitly account for communication channel bandwidth constraints and dynamically changing communication topology preventing constant, complete exchange of information. In addition, this overall approach closes the loop between motion control and planning for a sensor network (e.g., a mobile swarm) to increase the value of information obtained by multimodal upstream data fusion, leading to higher accuracy of decentralized, on-device multi-target classification.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is to be understood that the examples of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various examples of the present invention can be referred to herein along with alternatives for the various components thereof. It is understood that such examples and alternatives are not to be construed as de facto equivalents of one another, but are to be considered as separate and autonomous representations of the present technology.

Furthermore, the described features, structures, or characteristics can be combined in any suitable manner in one or more examples. In the description, numerous specific details are provided, such as examples of lengths, widths, shapes, etc., to provide a thorough understanding of examples of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description. Reference throughout this specification to "one example" or "an example" means that a particular feature, structure, or characteristic described in connection with the example is included in at least one example of the present invention. Thus, appearances of the phrases "in one example" or "in an example" in various places throughout this specification are not necessarily all referring to the same example.

Although the disclosure may not expressly disclose that some examples or features described herein may be combined or interchanged with other examples or features described herein, this disclosure should be read to describe any such combinations that would be practicable by one of ordinary skill in the art no matter the specific examples that were described. Indeed, unless a certain combination of elements or functions not expressly disclosed would conflict with one another, such that the combination would render the resulting example inoperable or impracticable as would be apparent to those skilled in the art, this disclosure is meant to contemplate that any disclosed element or feature or function in any example described herein can be incorporated into any other example described herein (e.g., the elements or features or functions combined or interchanged with other elements or features or functions across examples) even though such combinations or interchange of elements or features or functions and resulting examples may not have been specifically or expressly disclosed and described. Indeed, the following examples are further illustrative of several embodiments of the present technology:

Example 1. A method for controlling a sensor node network, comprising:
  obtaining sensor data from a plurality of sensors which include a plurality of sensor modalities, wherein the sensors are associated with sensor nodes;
  combining the sensor data in a joint feature space that represents multimodal input from the plurality of sensor modalities;
  detecting features from the sensor data using the joint feature space;
  identifying neighboring sensor nodes to receive the features; and
  sending the features to other sensor nodes in the sensor node network.

2. The method as in example 1, further comprising correlating spatial position data of the features by time and modality in the joint feature space for the sensor data of a sensor node.

3. The method as in any preceding example, further comprising sending the features to other sensor nodes that are neighbors within a communication neighborhood when a feature is available.

4. The method as in any preceding example, further comprising applying low-rank tensor regression to sensor data from separate sensor data modalities to enable discovery of cross-modality contextual correlations that are features in the sensor data from the plurality of sensors.

5. The method as in any preceding example, further comprising, using an online reinforcement learning (RL) process to adapt sensor control parameters, wherein a reward function is maximized by modifying the sensor control parameters until features related to events are detected, tracked and classified.

6. The method as in any preceding example, further comprising using a non-cooperative differential game, consensus negotiation protocol and distributed messages for determining a global sensor network utility function.

7. The method as in any preceding example, further comprising applying game theory to influence a focus of RL (reinforcement learning) agents of the sensor nodes.

8. The method as in any preceding example, further comprising:
  receiving a notification that a communication link has terminated on one or more sensor nodes; and
  playing an assignment game via remaining communication links, wherein the one or more sensor nodes can operate their RL (reinforcement learning) agents to allow the sensor nodes to continue to maintain situation awareness.

9. The method as in any preceding example, wherein the features are relevant to events captured in the sensor data.

10. The method as in any preceding example, further comprising sensing a feature in the sensor data based on detecting a response of elements of the environment.

11. The method as in any preceding example, further comprising sensing a feature in the sensor data based on detecting a response of humans in the environment.

12. The method as in any preceding example, further comprising using game theory to decide which features received from other sensor nodes to use in order increase a reward for a RL (reinforcement learning) process.

13. The method as in any preceding example, further comprising using utility functions with Nash equilibrium for a game allocating targets to sensors involved in the game.

14. A system for controlling a sensor node network, comprising:
  at least one processor;
  a memory device including instructions that, when executed by the at least one processor, cause the system to:
  obtain sensor data from a plurality of sensors which include a plurality of sensor modalities, wherein the sensors are associated with sensor nodes;
  combine the sensor data in a joint feature space that represents multimodal input from the plurality of sensor modalities, wherein spatial position data of the features is correlated by time and modality in the joint feature space;
  detect features from the sensor data using the joint feature space;
  identify neighboring sensor nodes to receive the features; and
  send the features to other sensor nodes in the sensor node network.

15. The system as in example 14, further comprising sending the features to other sensor nodes that are neighbors within a communication neighborhood when a feature is available.

16. The system as in any preceding example, further comprising applying low-rank tensor regression to sensor data from separate sensor data modalities to enable discovery of cross-modality contextual correlations that are features in the sensor data from the sensors.

17. The system as in any preceding example, further comprising, using an online reinforcement learning (RL) process with an in-situ training process to adapt sensor control parameters, wherein a reward function is maximized by modifying the sensor control parameters until features related to events are detected, tracked and classified.

18. The system as in any preceding example, further comprising using a non-cooperative differential game, consensus negotiation protocol and distributed messages for determining a global sensor network utility function.

19. The system as in any preceding example, further comprising applying game theory to influence a focus of reinforcement learning agents of the sensor nodes.

20. The system as in any preceding example, further comprising:
  receiving a notification that a communication link has terminated on one or more sensor nodes; and
  playing an assignment game via remaining communication links, wherein the sensor nodes can operate RL (reinforcement learning) agents to allow the sensor nodes to continue to maintain situation awareness.

21. The system as in any preceding example, wherein the features are relevant to events captured in the sensor data.

22. The system as in any preceding example, further comprising sensing a feature in the sensor data based on detecting a response of elements of the environment.

23. The system as in any preceding example, further comprising sensing a feature in the sensor data based on detecting a response of humans in the environment.

24. The system as in any preceding example, further comprising using game theory to decide which features received from other sensor nodes to use in order increase a reward for an RL (reinforcement learning) process.

25. The system as in any preceding example, further comprising using utility functions with Nash equilibrium for a game allocating targets to sensors involved in the game.

26. A non-transitory machine readable storage medium having instructions embodied thereon, the instructions when executed by one or more processors, cause the one or more processors to perform a process including:
obtaining sensor data from a plurality of sensors which include a plurality of sensor modalities, wherein the sensors are associated with sensor nodes;
combining the sensor data in a joint feature space that represents multimodal input from the plurality of sensor modalities, wherein spatial position data of the features is correlated by time and modality in the joint feature space;
detecting features from the sensor data using the joint feature space;
identifying neighboring sensor nodes to receive the features; and
sending the features to other sensor nodes in a sensor node network.

27. The non-transitory machine readable storage medium as in example 26, further comprising sending the features to other sensor nodes that are neighbors within a communication neighborhood when a feature is available.

28. The non-transitory machine readable storage medium as in any preceding example, further comprising applying low-rank tensor regression to sensor data from separate sensor data modalities to enable discovery of cross-modality contextual correlations that are features in the sensor data from the sensors.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

The term "comprising" is used throughout to mean including at least the recited feature(s) such that any greater number of the same feature and/or additional types of other features are not precluded. It will also be appreciated that specific embodiments have been described herein for purposes of illustration, but that various modifications can be made without deviating from the technology. Further, while advantages associated with some embodiments of the present technology have been described in the context of those embodiments, other embodiments can also exhibit such advantages, and not all embodiments need necessarily exhibit such advantages to fall within the scope of the technology. Accordingly, the disclosure and associated present technology can encompass other embodiments not expressly shown or described herein.

Moreover, unless the word "or" is expressly limited to mean only a single item exclusive from other items in reference to a list of two or more items, then the use of "or" in such a list is to be interpreted as including (a) any single item in the list, (b) all of the items in the list, or (c) any combination of the items in the list. In other words, the use of "or" in this disclosure should be understood to mean non-exclusive "or" (i.e., "and/or") unless otherwise indicated herein.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described present technology.

The invention claimed is:

1. A method for controlling a sensor node network, comprising:
obtaining sensor data from a plurality of sensors which include a plurality of sensor modalities, wherein the sensors are associated with sensor nodes;
combining the sensor data in a joint feature space that represents multimodal input from the plurality of sensor modalities;
detecting features from the sensor data using the joint feature space;
identifying neighboring sensor nodes to receive the features;
sending the features to other sensor nodes in the sensor node network; and
applying low-rank tensor regression to sensor data from separate sensor data modalities to enable discovery of cross-modality contextual correlations that are features in the sensor data from the plurality of sensors.

2. The method as in claim 1, further comprising correlating spatial position data of the features by time and modality in the joint feature space for the sensor data of a sensor node.

3. The method as in claim 1, further comprising sending the features to other sensor nodes that are neighbors within a communication neighborhood when a feature is available.

4. The method as in claim 1, further comprising, using an online reinforcement learning (RL) process to adapt sensor control parameters, wherein a reward function is maximized by modifying the sensor control parameters until features related to events are detected, tracked and classified.

5. The method as in claim 1, further comprising using a non-cooperative differential game, consensus negotiation protocol and distributed messages for determining a global sensor network utility function.

6. The method as in claim 1, further comprising applying game theory to influence a focus of RL (reinforcement learning) agents of the sensor nodes.

7. The method as in claim 1, further comprising:
receiving a notification that a communication link has terminated on one or more sensor nodes; and
playing an assignment game via remaining communication links, wherein the one or more sensor nodes can operate their RL (reinforcement learning) agents to allow the sensor nodes to continue to maintain situation awareness.

8. The method as in claim 1, wherein the features are relevant to events captured in the sensor data.

9. The method as in claim 1, further comprising sensing a feature in the sensor data based on detecting a response of elements of the environment.

10. The method as in claim 1, further comprising sensing a feature in the sensor data based on detecting a response of humans in the environment.

11. The method as in claim 1, further comprising using game theory to decide which features received from other sensor nodes to use in order increase a reward for a RL (reinforcement learning) process.

12. The method as in claim 1, further comprising using utility functions with Nash equilibrium for a game allocating targets to sensors involved in the game.

13. A system for controlling a sensor node network, comprising:

at least one processor;
a memory device including instructions that, when executed by the at least one processor, cause the system to:
obtain sensor data from a plurality of sensors which include a plurality of sensor modalities, wherein the sensors are associated with sensor nodes;
combine the sensor data in a joint feature space that represents multimodal input from the plurality of sensor modalities, wherein spatial position data of the features is correlated by time and modality in the joint feature space;
detect features from the sensor data using the joint feature space;
identify neighboring sensor nodes to receive the features;
send the features to other sensor nodes in the sensor node network; and
apply low-rank tensor regression to sensor data from separate sensor data modalities to enable discovery of cross-modality contextual correlations that are features in the sensor data from the sensors.

14. The system as in claim 13, further comprising sending the features to other sensor nodes that are neighbors within a communication neighborhood when a feature is available.

15. The system as in claim 13, further comprising, using an online reinforcement learning (RL) process with an in-situ training process to adapt sensor control parameters, wherein a reward function is maximized by modifying the sensor control parameters until features related to events are detected, tracked and classified.

16. The system as in claim 13, further comprising using a non-cooperative differential game, consensus negotiation protocol and distributed messages for determining a global sensor network utility function.

17. The system as in claim 13, further comprising applying game theory to influence a focus of reinforcement learning agents of the sensor nodes.

18. The system as in claim 13, further comprising:
receiving a notification that a communication link has terminated on one or more sensor nodes; and
playing an assignment game via remaining communication links, wherein the sensor nodes can operate RL (reinforcement learning) agents to allow the sensor nodes to continue to maintain situation awareness.

19. The system as in claim 13, wherein the features are relevant to events captured in the sensor data.

20. The system as in claim 13, further comprising sensing a feature in the sensor data based on detecting a response of elements of the environment.

21. The system as in claim 13, further comprising sensing a feature in the sensor data based on detecting a response of humans in the environment.

22. The system as in claim 13, further comprising using game theory to decide which features received from other sensor nodes to use in order increase a reward for an RL (reinforcement learning) process.

23. The system as in claim 13, further comprising using utility functions with Nash equilibrium for a game allocating targets to sensors involved in the game.

24. A non-transitory machine readable storage medium having instructions embodied thereon, the instructions when executed by one or more processors, cause the one or more processors to perform a process including:
obtaining sensor data from a plurality of sensors which include a plurality of sensor modalities, wherein the sensors are associated with sensor nodes;
combining the sensor data in a joint feature space that represents multimodal input from the plurality of sensor modalities, wherein spatial position data of the features is correlated by time and modality in the joint feature space;
detecting features from the sensor data using the joint feature space;
identifying neighboring sensor nodes to receive the features;
sending the features to other sensor nodes in a sensor node network; and
applying low-rank tensor regression to sensor data from separate sensor data modalities to enable discovery of cross-modality contextual correlations that are features in the sensor data from the sensors.

25. The non-transitory machine readable storage medium as in claim 24, further comprising sending the features to other sensor nodes that are neighbors within a communication neighborhood when a feature is available.

26. A method for controlling a sensor node network, comprising:
obtaining sensor data from a plurality of sensors which include a plurality of sensor modalities, wherein the sensors are associated with sensor nodes;
combining the sensor data in a joint feature space that represents multimodal input from the plurality of sensor modalities;
detecting features from the sensor data using the joint feature space;
identifying neighboring sensor nodes to receive the features;
sending the features to other sensor nodes in the sensor node network; and
using a non-cooperative differential game, consensus negotiation protocol and distributed messages for determining a global sensor network utility function.

27. A method for controlling a sensor node network, comprising:
obtaining sensor data from a plurality of sensors which include a plurality of sensor modalities, wherein the sensors are associated with sensor nodes;
combining the sensor data in a joint feature space that represents multimodal input from the plurality of sensor modalities;
detecting features from the sensor data using the joint feature space;
identifying neighboring sensor nodes to receive the features;
sending the features to other sensor nodes in the sensor node network; and
applying game theory to influence a focus of RL (reinforcement learning) agents of the sensor nodes.

28. A method for controlling a sensor node network, comprising:
obtaining sensor data from a plurality of sensors which include a plurality of sensor modalities, wherein the sensors are associated with sensor nodes;
combining the sensor data in a joint feature space that represents multimodal input from the plurality of sensor modalities;
detecting features from the sensor data using the joint feature space;
identifying neighboring sensor nodes to receive the features;
sending the features to other sensor nodes in the sensor node network;

receiving a notification that a communication link has terminated on one or more sensor nodes; and playing an assignment game via remaining communication links, wherein the one or more sensor nodes can operate their RL (reinforcement learning) agents to allow the sensor nodes to continue to maintain situation awareness.

29. A method for controlling a sensor node network, comprising:

obtaining sensor data from a plurality of sensors which include a plurality of sensor modalities, wherein the sensors are associated with sensor nodes;

combining the sensor data in a joint feature space that represents multimodal input from the plurality of sensor modalities;

detecting features from the sensor data using the joint feature space;

identifying neighboring sensor nodes to receive the features;

sending the features to other sensor nodes in the sensor node network; and using game theory to decide which features received from other sensor nodes to use in order increase a reward for a RL (reinforcement learning) process.

30. A system for controlling a sensor node network, comprising:

at least one processor;

a memory device including instructions that, when executed by the at least one processor, cause the system to:

obtain sensor data from a plurality of sensors which include a plurality of sensor modalities, wherein the sensors are associated with sensor nodes;

combine the sensor data in a joint feature space that represents multimodal input from the plurality of sensor modalities, wherein spatial position data of features is correlated by time and modality in the joint feature space;

detect features from the sensor data using the joint feature space;

identify neighboring sensor nodes to receive the features;

send the features to other sensor nodes in the sensor node network; and use a non-cooperative differential game, consensus negotiation protocol and distributed messages for determining a global sensor network utility function.

31. A system for controlling a sensor node network, comprising:

at least one processor;

a memory device including instructions that, when executed by the at least one processor, cause the system to:

obtain sensor data from a plurality of sensors which include a plurality of sensor modalities, wherein the sensors are associated with sensor nodes;

combine the sensor data in a joint feature space that represents multimodal input from the plurality of sensor modalities, wherein spatial position data of features is correlated by time and modality in the joint feature space;

detect features from the sensor data using the joint feature space;

identify neighboring sensor nodes to receive the features;

send the features to other sensor nodes in the sensor node network; and apply game theory to influence a focus of reinforcement learning agents of the sensor nodes.

32. A system for controlling a sensor node network, comprising:

at least one processor;

a memory device including instructions that, when executed by the at least one processor, cause the system to:

obtain sensor data from a plurality of sensors which include a plurality of sensor modalities, wherein the sensors are associated with sensor nodes;

combine the sensor data in a joint feature space that represents multimodal input from the plurality of sensor modalities, wherein spatial position data of features is correlated by time and modality in the joint feature space;

detect features from the sensor data using the joint feature space;

identify neighboring sensor nodes to receive the features;

send the features to other sensor nodes in the sensor node network;

receive a notification that a communication link has terminated on one or more sensor nodes; and play an assignment game via remaining communication links, wherein the sensor nodes can operate RL (reinforcement learning) agents to allow the sensor nodes to continue to maintain situation awareness.

33. A system for controlling a sensor node network, comprising:

at least one processor;

a memory device including instructions that, when executed by the at least one processor, cause the system to:

obtain sensor data from a plurality of sensors which include a plurality of sensor modalities, wherein the sensors are associated with sensor nodes;

combine the sensor data in a joint feature space that represents multimodal input from the plurality of sensor modalities, wherein spatial position data of features is correlated by time and modality in the joint feature space;

detect features from the sensor data using the joint feature space;

identify neighboring sensor nodes to receive the features;

send the features to other sensor nodes in the sensor node network; and use game theory to decide which features received from other sensor nodes to use in order increase a reward for an RL (reinforcement learning) process.

* * * * *